US009118792B2

(12) United States Patent
Miyamoto et al.

(10) Patent No.: US 9,118,792 B2
(45) Date of Patent: Aug. 25, 2015

(54) IMAGE FORMING APPARATUS AND CONTROL METHOD THEREFOR

(71) Applicant: KYOCERA DOCUMENT SOLUTIONS INC., Osaka (JP)

(72) Inventors: Naruyuki Miyamoto, Osaka (JP); Yukio Tanisaki, Osaka (JP); Kentaro Naruse, Osaka (JP); Rie Tezuka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 114 days.

(21) Appl. No.: 13/928,549

(22) Filed: Jun. 27, 2013

(65) Prior Publication Data

US 2014/0002843 A1    Jan. 2, 2014

(30) Foreign Application Priority Data

Jun. 29, 2012   (JP) .................. 2012-147729

(51) Int. Cl.
  *G06F 3/12*       (2006.01)
  *H04N 1/00*       (2006.01)
  *G01J 5/02*       (2006.01)

(52) U.S. Cl.
  CPC ....... *H04N 1/00896* (2013.01); *H04N 1/00891* (2013.01); *H04N 1/00912* (2013.01)

(58) Field of Classification Search
  CPC .................................. H04N 1/00912
  USPC ....................................... 358/1.13
  See application file for complete search history.

(56) References Cited

U.S. PATENT DOCUMENTS

| 5,703,368 | A  |   | 12/1997 | Tomooka et al. |
| 6,577,825 | B1 | * | 6/2003  | Gonnella et al. ............... 399/38 |
| 8,768,196 | B2 | * | 7/2014  | Baba et al. ...................... 399/81 |
| 8,823,967 | B2 | * | 9/2014  | Mamiya et al. .............. 358/1.14 |
| 2013/0250372 | A1 | * | 9/2013 | Ogata et al. ................... 358/442 |

FOREIGN PATENT DOCUMENTS

| JP | 06-242226 A | 9/1994 |
| JP | 09-063347 A | 3/1997 |
| JP | 09-101376 A | 4/1997 |

* cited by examiner

*Primary Examiner* — Ashish K Thomas
*Assistant Examiner* — Neil R McLean
(74) *Attorney, Agent, or Firm* — Morgan, Lewis & Bockius LLP

(57) ABSTRACT

In an image forming apparatus, a first detection portion includes a pyroelectric sensor and detects the upper half of the human body. A first signal generation portion generates a first signal whose level varies according to the output value of the pyroelectric sensor. A second detection portion includes a pyroelectric sensor and detects a lower area than the first detection portion. A second signal generation portion generates a second signal whose level varies according to the output value of the pyroelectric sensor. A storage portion stores discrimination data including data defining, with respect to the waveforms of the first and second signals, a condition for recognizing a human moving toward the image forming apparatus and a condition for recognizing a human crossing a detection area of the pyroelectric sensors. A recognition portion recognizes the direction of movement of a human.

14 Claims, 12 Drawing Sheets

FIG.6
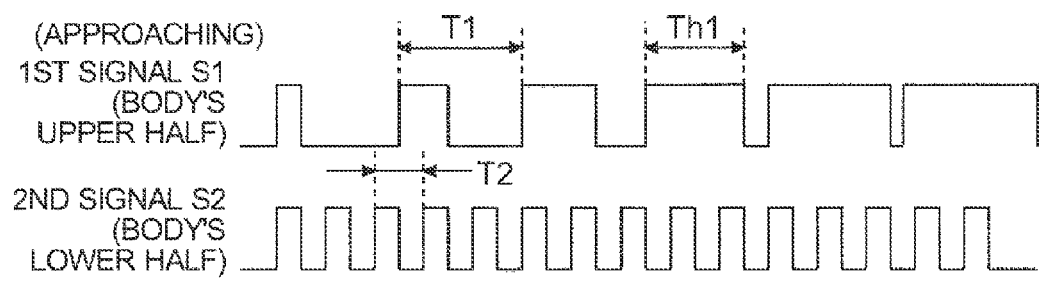
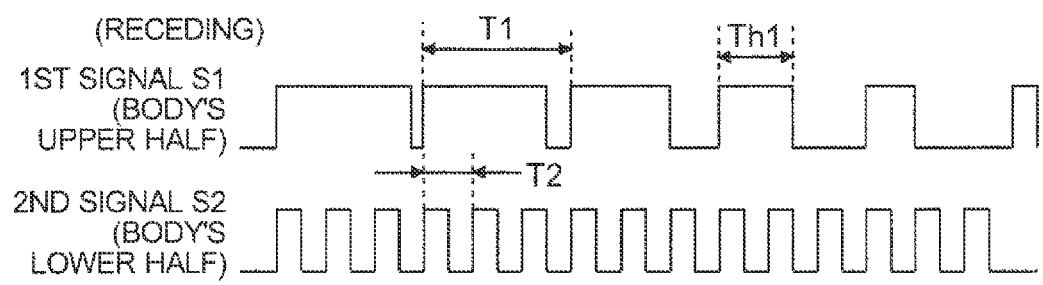
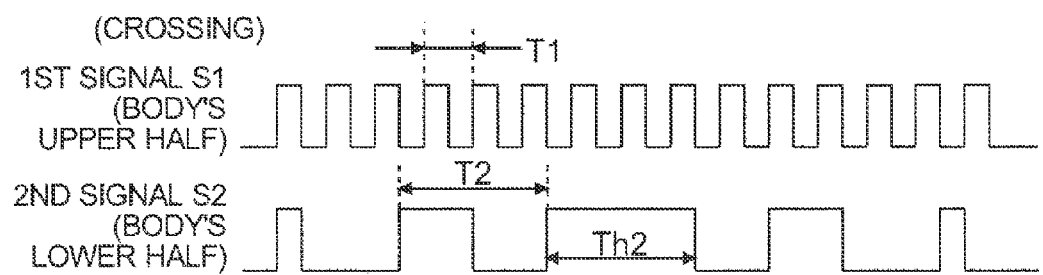

FIG.7

| MOVEMENT DIRECTION | SIGNAL VARIATION PATTERN | FREQUENCY | CYCLE |
|---|---|---|---|
| APPROACHING | HIGH-LEVEL PERIOD TH1 OF 1ST SIGNAL S1 BECOMES LONGER (DUTY FACTOR INCREASES) | f1<f2 | T1>T2 |
| RECEDING | HIGH-LEVEL PERIOD TH1 OF 1ST SIGNAL S1 BECOMES SHORTER (DUTY FACTOR DECREASES) | f1<f2 | T1>T2 |
| CROSSING | HIGH-LEVEL PERIOD TH2 OF 2ND SIGNAL S2 INCREASES & DECREASES (DUTY FACTOR INCREASES & DECREASES | f1>f2 | T1<T2 |

FIG.9
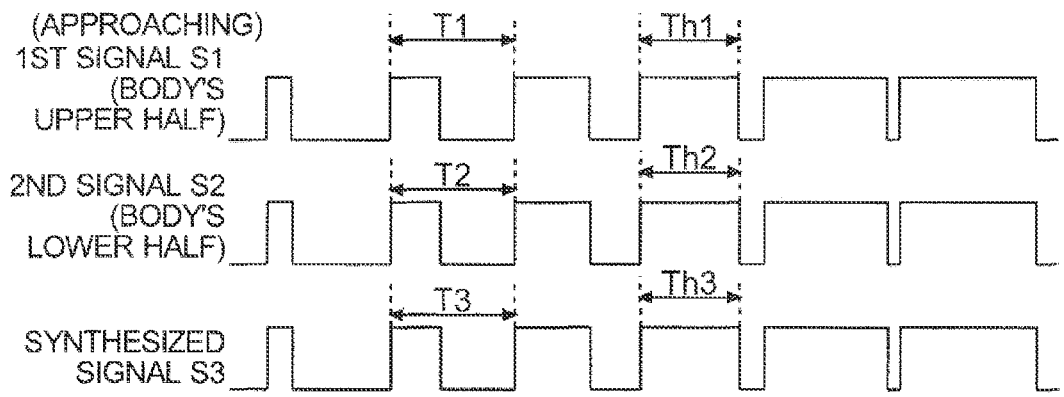
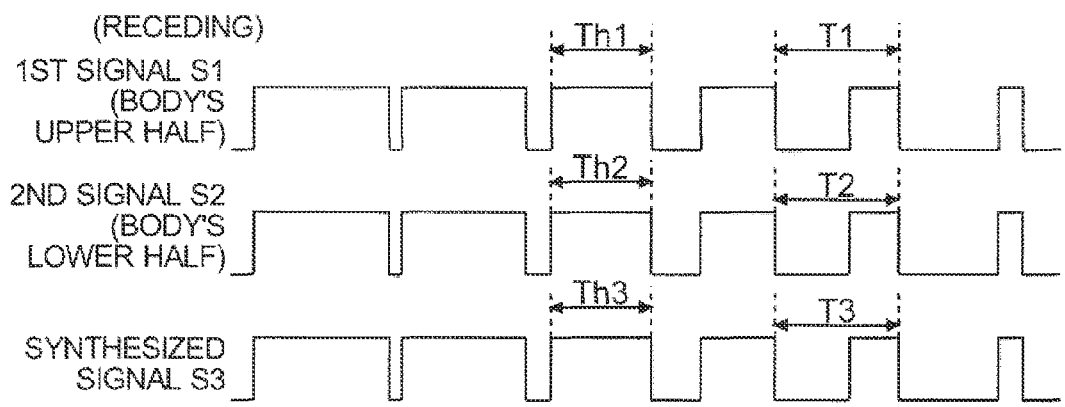
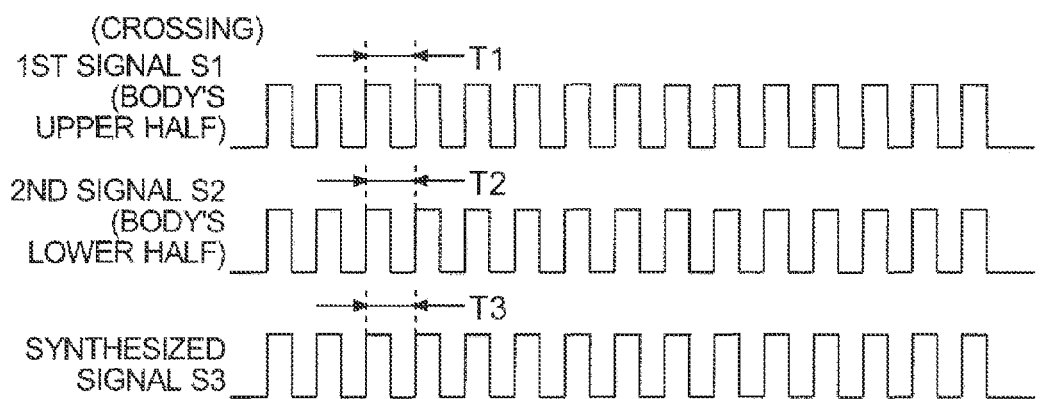

FIG.10

| MOVEMENT DIRECTION | SIGNAL VARIATION PATTERN 1 | SIGNAL VARIATION PATTERN 2 |
|---|---|---|
| APPROACHING | HIGH-LEVEL PERIODS TH1 & TH2 OF 1ST & 2ND SIGNALS S1 & S2 BOTH BECOME LONGER (DUTY FACTORS INCREASE) | HIGH-LEVEL PERIOD TH3 OF SYNTHESIZED SIGNAL S3 BECOMES LONGER (DUTY FACTOR INCREASES) |
| RECEDING | HIGH-LEVEL PERIODS TH1 & TH2 OF 1ST & 2ND SIGNALS S1 & S2 BOTH BECOME SHORTER (DUTY FACTORS DECREASE) | HIGH-LEVEL PERIOD TH3 OF SYNTHESIZED SIGNAL S3 BECOMES SHORTER (DUTY FACTOR DECREASES) |
| CROSSING | $f1 > fa, f2 > fa,$ $(T1 < Ta, T2 < Ta)$ | $T3 > fa$ $(T3 < Ta)$ |

FIG.12

| MOVEMENT DIRECTION | SIGNAL VARIATION PATTERN 1 | SIGNAL VARIATION PATTERN 2 |
|---|---|---|
| APPROACHING/ RECEDING | $f1 > fb, f2 > fb,$ $(T1 < Tb, T2 < Tb)$ | $T3 > fb$ $(T3 < Tb)$ |
| CROSSING | HIGH-LEVEL PERIODS TH1 & TH2 OF 1ST & 2ND SIGNALS S1 & S2 INCREASE AND DECREASE (DUTY FACTORS INCREASE AND DECREASE) | HIGH-LEVEL PERIOD TH3 OF SYNTHESIZED SIGNAL S3 INCREASES AND DECREASES (DUTY FACTOR INCREASES AND DECREASES) |

IMAGE FORMING APPARATUS AND CONTROL METHOD THEREFOR

INCORPORATION BY REFERENCE

This application is based upon and claims the benefit of priority from the corresponding Japanese Patent Application No. 2012-147729 filed on Jun. 29, 2012, the entire contents of which are incorporated herein by reference.

BACKGROUND

The present disclosure relates to an image forming apparatus that recognizes movement of a human body (hereinafter also a "human" or a "user") by exploiting heat radiated therefrom.

Conventionally, an infrared sensor that detects infrared radiation emanating from a human is commonly used to detect whether or not a human is present within a detection area. For example, results of detecting presence/absence of a human body are used for surveillance and other purposes. For example, a detecting device that uses two sensor units to detect a human body as described below is known.

Specifically, a passive infrared human body detection device is known that is provided with: two sensor units each comprising a light receiving element and an optical system, the first sensor unit being arranged with its light receiving direction pointing to the upper half of the human body to be detected so as to have a detection area that does not reach the ground, the second sensor unit being arranged to have a detection area below that detection area so as to point to the ground at a predetermined detection distance away; two level detection circuits that output detection signals when the output electrical signals from the light receiving elements of the two sensor units exceed predetermined levels; and a human body detection circuit that outputs a human body detection signal when both of the level detection circuits output the detection signals.

When a user wants an image forming apparatus (such as a multifunction product or a copier) to execute a job such as copying or document reading, to make settings and to command execution of the job, the user operates the image forming apparatus.

An infrared sensor may be provided on the image forming apparatus. Whether or not a human is present within the detection area of the infrared sensor may be detected so that results of the detection can be used to manage and control the operation of the image forming apparatus.

For example, when presence of a human is detected within the detection area of the infrared sensor, power saving mode, in which the supply of electric power to particular portions in the image forming apparatus is stopped, can be canceled. Then, the user can make the image forming apparatus execute a job with almost no wait.

However, even in a case like when a human passes by in front of the image forming apparatus, the human enters the detection area of the infrared sensor. In this case, the user approaches the image forming apparatus with no intention to use it; accordingly, there is no need to restart the supply of the electric power to the particular portions (power saving mode should be maintained). However, by conventional detection using an infrared sensor, a human simply passing by (a human simply entering the detection area of the infrared sensor) causes cancellation of the pyroelectric sensor, resulting in unnecessary consumption of electric power.

To eliminate such waste, whether or not a human is approaching the image forming apparatus should be detected accurately. However, by conventional human body detection using an infrared sensor, presence of a human within the detection area of the infrared sensor can be detected, but whether the user is moving toward the image forming apparatus or is simply crossing the detection area is not detected with an accurate distinction. Thus, there is conventionally the problem that the direction of movement of a human with respect to the image forming apparatus cannot be detected accurately.

Here, in the conventional technology mentioned above, the use of two sensor units with different detection areas may increase the likelihood of achieving accurate detection of presence/absence of a human. However, the conventional technology mentioned above does not provide a procedure, method, or technique that enables recognition of whether a human is moving toward the spot where the sensor is provided or is crossing the detection area of the sensor with an accurate distinction. Thus, the conventional technology mentioned above is not free from the problem discussed above.

SUMMARY

To solve the problem discussed above, an image forming apparatus includes a first detection portion, a first signal generation portion, a second detection portion, a second signal generation portion, a storage portion, and a recognition portion. The first detection portion includes a pyroelectric sensor, and detects the upper half of the human body. The first signal generation portion receives the output of the pyroelectric sensor of the first detection portion to generate a first signal whose level varies according to whether or not the output value of the pyroelectric sensor of the first detection portion is greater than a prescribed threshold value. The second detection portion includes a pyroelectric sensor, and detects a lower area than the first detection portion to detect the lower half of the human body. The second signal generation portion receives the output of the pyroelectric sensor of the second detection portion to generate a second signal whose level varies according to whether or not the output value of the pyroelectric sensor of the second detection portion is greater than a prescribed threshold value. The storage portion stores discrimination data including data defining, with respect to the waveforms of the first and second signals, a condition for recognizing a human moving toward the image forming apparatus and a condition for recognizing a human crossing a detection area of the pyroelectric sensors. The recognition portion recognizes the direction of movement of a human with respect to the image forming apparatus by recognizing, based on the waveforms of the first and second signals and the discrimination data, whether a human is moving toward the image forming apparatus and whether a human is crossing the detection area of the pyroelectric sensors.

Further features and advantages of the present disclosure will become apparent from the description of embodiments given below.

BRIEF DESCRIPTION OF THE DRAWINGS

FIG. 6 is a timing chart showing the waveforms of first and second signals according to movement direction in a multifunction product according to a first embodiment.

FIG. 7 is a diagram showing discrimination data in a multifunction product according to the first embodiment.

FIG. 9 is a timing chart showing the waveforms of first and second signals according to movement direction in a multifunction product according to a second embodiment.

FIG. 10 is a diagram showing discrimination data in a multifunction product according to the second embodiment.

FIG. 12 is a diagram showing discrimination data in a multifunction product according to the third embodiment.

DETAILED DESCRIPTION

Hereinafter, embodiments of the present disclosure will be described with reference to FIGS. 1 to 12. First, with reference to FIGS. 1 to 8, a first embodiment will be described; then with reference to FIGS. 9 and 10, a second embodiment will be described; and then with reference to FIGS. 11 and 12, a third embodiment will be described. The following description of those embodiments deals with a multifunction product 100 (also known as a multifunction peripheral or a multifunction printer, corresponding to an image forming apparatus) as an example. It should be understood, however, that the specific features in terms of structure, arrangement, and other aspects that are mentioned in the description of the embodiments are not meant to limit the scope of the disclosure but are merely examples for description purposes.

(Outline of the Construction of a Multifunction Product 100)

Figure 1:
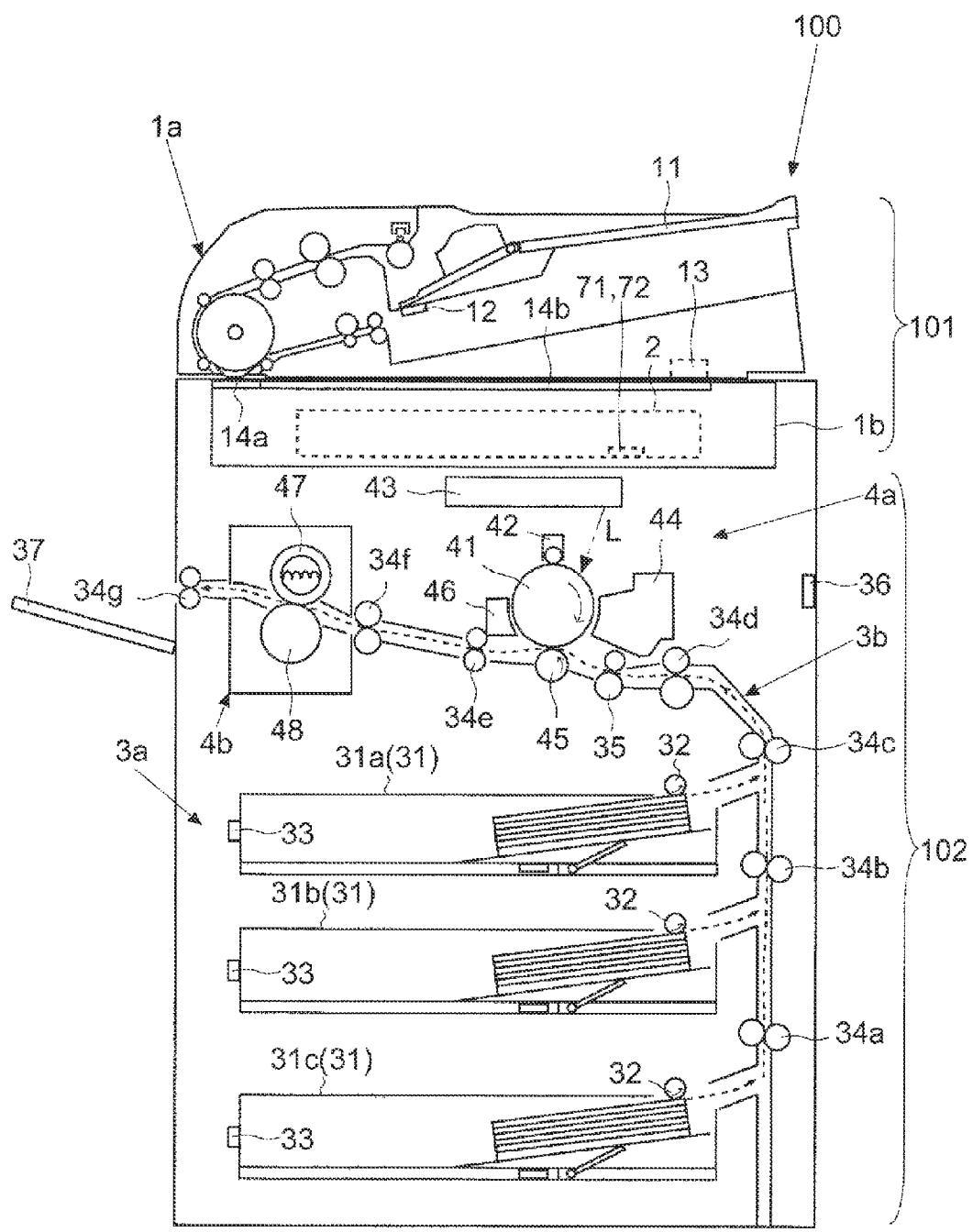
FIG. 1 is a schematic front sectional view of a multifunction product.

First, with reference to FIG. 1, an outline of a multifunction product 100 according to an embodiment will be described. FIG. 1 is a schematic front sectional view of the multifunction product 100.

The multifunction product 100 is provided with, in a topmost part thereof, a reading section 101 (image reading device) which includes a document transport section 1*a* and an image reading section 1*b*. The document transport section 1*a* transports one sheet after another of a document stacked on a document placement tray 11 to a reading position (a position over a contact glass 14*a* for feed-reading) in the image reading section 1*b*. The document placement tray 11 is provided with a document placement detection sensor 12 for detecting placement of a document. The document placement detection sensor 12 is an optical sensor, and its output varies between when a document is placed and when no document is placed.

About a pivot (not shown) provided at the sheets' leading side, the document transport section 1*a* can be lifted up to be opened. As indicated by a broken line in FIG. 1, an open/close detection sensor 13 is provided for detecting whether the document transport section 1*a* is open or closed. For example, the open/close detection sensor 13 may be an interlock-type switch that makes contact with the bottom face of the document transport section 1*a*, or may be a reflection-type optical sensor. The output of the open/close detection sensor 13 varies according to whether the document transport section 1*a* is in an open or closed state.

During a job such as copying, scanning, or image data transmission, the image reading section 1*b* reads a document and generates image data. On the top face of the image reading section 1*b*, contact glass 14 (comprising two types 14*a* and 14*b*) is provided. Inside, there are provided optical system members such as a movable frame (on which an exposure lamp, a mirror, etc. are mounted) that moves in a horizontal direction (for example, in the left/right direction in FIG. 1), a lens, and an image sensor (for example, a CCD image sensor). In a case where a document that is transported sequentially, one sheet after another, by the document transport section 1*a* is read, the movable frame is fixed under the feed-reading contact glass 14*a*, while the light reflected from the document is directed through the lens to the image sensor. On the other hand, when a document placed on the stationary-reading contact glass 14*b* is read, the movable frame is moved in a horizontal direction.

By using those optical system members, the image reading section 1*b* irradiates the document with light; the image reading section 1*b* then performs A/D conversion on the output values from the pixels of the image sensor that has received the light reflected from the document, and thereby generates image data. Based on the read image data, the multifunction product 100 can perform printing and transmission (printing and transmission functions).

As indicated by a broken line in FIG. 1, in an upper front part, an operation panel 2 is provided which accepts entry of settings and instructions for copying and the like and which displays various kinds of information. In a front-edge part of the operation panel 2, there are provided a first detection portion 71 and a second detection portion 72 (described in detail later) which each include a pyroelectric sensor.

Inside the main unit of the multifunction product 100, a printing engine section 102 is provided which includes a sheet feeding section 3*a*, a transport section 3*b*, an image formation section 4*a*, and a fusing section 4*b*. The printing engine section 102 performs printing on sheets of paper according to the image data.

In the sheet feeding section 3*a*, a total of three cassettes 31 (31*a*, 31*b*, and 31*c*) for housing and feeding sheets are stacked one over another in a vertical direction. The cassettes 31 (31*a* to 31*c*) are each provided with a sheet feed roller 32. The sheet feed roller 32 is driven to rotate to feed the housed sheets. Each cassette 31 can be unloaded and loaded for sheet replenishment. To detect whether or not the cassettes 31 are loaded or unloaded, load/unload detection sensors 3 are provided one for each of them. The load/unload detection sensors 33 may be interlock-type switches that make contact with one face of each cassette 31, or may be reflection-type optical sensors, and their outputs vary according to whether the corresponding cassettes are loaded or unloaded.

The transport section 3*b* is a passage through which sheets are transported within the apparatus. In the transport section 3*b*, there are provided, among others, a plurality of pairs of transport rollers 34 (in FIG. 1, a total of seven pairs 34*a* to 34*g* from the upstream side) which are driven to rotate for sheet transport, and a pair of registration rollers 35 which keeps a transported sheet at stand-by short of the image formation section 4*a* to feed it in synchronism with the timing of transfer of a toner image.

For removal of jammed sheets and for maintenance in general, the multifunction product 100 has a front cover (not shown) that can be opened and closed. To detect whether the front cover is open or closed, a cover open/close sensor 36 is provided. The cover open/close sensor 36 may be an interlock-type switch that makes contact with part of the front cover, or may be an optical sensor, and its output varies according to whether the front cover is open or closed.

The image formation section 4a forms an image (toner image) based on image data, and transfers the toner image onto a sheet transported from the sheet feeding section 3a. Used as the image data is the image data of a document acquired by the image reading section 1b, or image data received from a computer 200 (see FIG. 2) or a facsimile (FAX) machine 300. The image formation section 4a is provided with a photosensitive drum 41 and, arranged around it, a charging device 42, an exposure device 43, a developing device 44, a transfer roller 45, a cleaning device 46, etc.

During toner image formation, the photosensitive drum 41 is driven to rotate. The charging device 42 charges the photosensitive drum 41 to a predetermined potential. The exposure device 43 outputs laser light L based on the image data, and scans, with the light L, the surface of the photosensitive drum 41 to form an electrostatic latent image. The developing device 44 then develops the electrostatic latent image with toner. To the transfer roller 45, a predetermined voltage is applied. Thus, the toner image on the photosensitive drum 41 is transferred onto the sheet that passes through the nip between the transfer roller 45 and the photosensitive drum 41. The cleaning device 46 removes the toner and the like that remain on the photosensitive drum 41 after transfer.

The fusing section 4b fuses the toner image transferred onto the sheet. The fusing section 4b includes a heating roller 47, incorporating a heating body, and a pressing roller 48. After toner fusion, the sheet is ejected onto the ejection tray 37.

(Hardware Configuration of the Multifunction Product 100)

Figure 2:
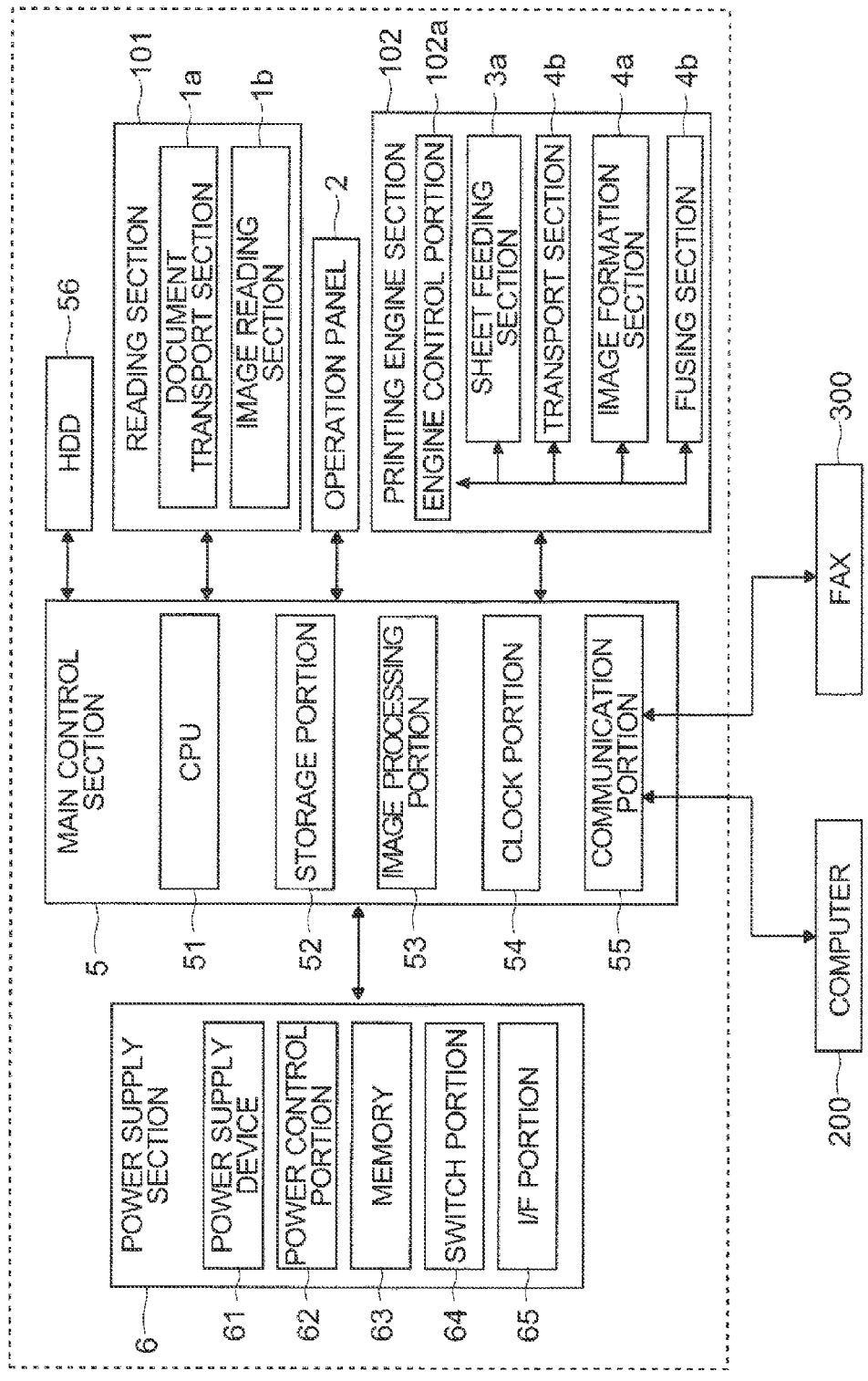
FIG. 2 is a diagram showing a hardware configuration of a multifunction product.

Next, with reference to FIG. 2, the hardware configuration of the multifunction product 100 according to an embodiment will be described. FIG. 2 is a diagram showing the hardware configuration of the multifunction product 100.

The multifunction product 100 has a main control section 5 (corresponding to a recognition portion) which is composed of a combination of various devices, circuits, and the like. The main control section 5 is communicatably connected to the reading section 101, the operation panel 2, the printing engine section 102, a power supply section 6, etc., and communicates with them to control their operation.

The main control section 5 includes a CPU 51, a storage portion 52, an image processing portion 53, a clock portion 54, a communication portion 55, etc. The CPU 51 is the arithmetic processing unit of the main control section 5. The CPU 51 performs processing and control based on data and programs stored in the storage portion 52. The storage portion 52 includes a non-volatile storage device (flash ROM) and a volatile storage device (for example, RAM). The storage portion 52 stores data and programs needed in various kinds of control that accompany execution of jobs. The main control section 5 is connectable to a HDD 56 as a large-capacity storage device. The HDD 56 stores data and programs needed in various kinds of control, image data, and the like.

The image processing portion 53 applies image processing to the image data generated by the image reading section 1b or image data fed in from outside. The image processing portion 53 includes an ASIC dedicated to image processing and a memory for image processing. The image data having undergone the image processing is fed to the exposure device 43 for printing (copier function, printer function), or stored in the HDD 56 (scanner function), or transmitted from the communication portion 55 (scanner function, facsimile transmission function). The CPU 51 and the storage portion 52 may be used to implement the functions of the image processing portion 53.

The clock portion 54 counts time. The communication portion 55 is an interface for conducting communication with an external computer 200 (a personal computer or a server) or a facsimile machine 300 across a network, a communication line, a cable, or the like. Accordingly, the communication portion 55 includes appropriate connectors and circuits, devices, controllers, etc. for communication. By communication through the communication portion 55, the multifunction product 100 can perform printing based on printing data received from outside (printer function), and can transmit image data to the external computer 200 or the facsimile machine 300 (transmission function).

For document reading, the main control section 5 is communicatably connected to the reading section 101 (the image reading section 1b and the document transport section 1a). During a job such as copying or image data transmission, the image reading section 1b and document transport section 1a are instructed by the main control section 5 to execute a document reading job.

The main control section 5 is communicatably connected also to the operation panel 2, which accepts entry of settings into, and displays indications from, the multifunction product 100. The operation panel 2 transmits to the main control section 5 the fact that a key is pressed and which key it is. Thereby the main control section 5 recognizes which key is pressed out of the hardware keys on the operation panel 2 and the keys displayed on a liquid crystal display portion.

As described previously, the multifunction product 100 is provided with the printing engine section 102 as the section that executes printing jobs. Within the printing engine section 102, there is provided an engine control portion 102a which is instructed by the main control section 5 to actually control the operation of the printing engine section 102. The engine control portion 102a includes a CPU, a memory for storing programs and data for controlling printing and other functions. The engine control portion 102a controls the members (for example, motors, circuits, heaters, etc.) included in the printing engine section 102 to achieve sheet feeding, transport, toner image formation, temperature control in the fusing section 4b, and other functions.

As the section related to the management of electric power within the multifunction product 100, the power supply section 6 is provided. The power supply section 6 controls the supply of electric power to the individual portions within the multifunction product 100. The power supply section 6 includes a power supply device 61, a power control portion 62 (for example, a CPU or a microprocessor) which controls the supply of electric power by controlling the power supply device 61 and a switch portion 64, a memory 63 which stores data and programs for the power supply section 6, the switch portion 64, an I/F portion 65, etc.

The power supply device 61 has a rectification circuit, a voltage step-up circuit, a voltage step-down circuit, etc., and is connected to a commercial electric power source. The power supply device 61 generates a plurality of voltages needed for the operation of the multifunction product 100. The switch portion 64 turns on and off the supply of electric power to the individual portions, such as the reading section 101 and the printing engine section 102, of the multifunction product 100. In other words, the power supply section 6 (power control portion 62), by using the switch portion 64, connects and disconnects the electric power supply line from the power supply device 61 to the reading section 101, the 102, etc. to turn on and off the supply of electric power to the individual portions. The I/F portion 65 is an interface for communication with the main control section 5 etc.

(Invoking and Canceling Power Saving Mode)

Figure 3:
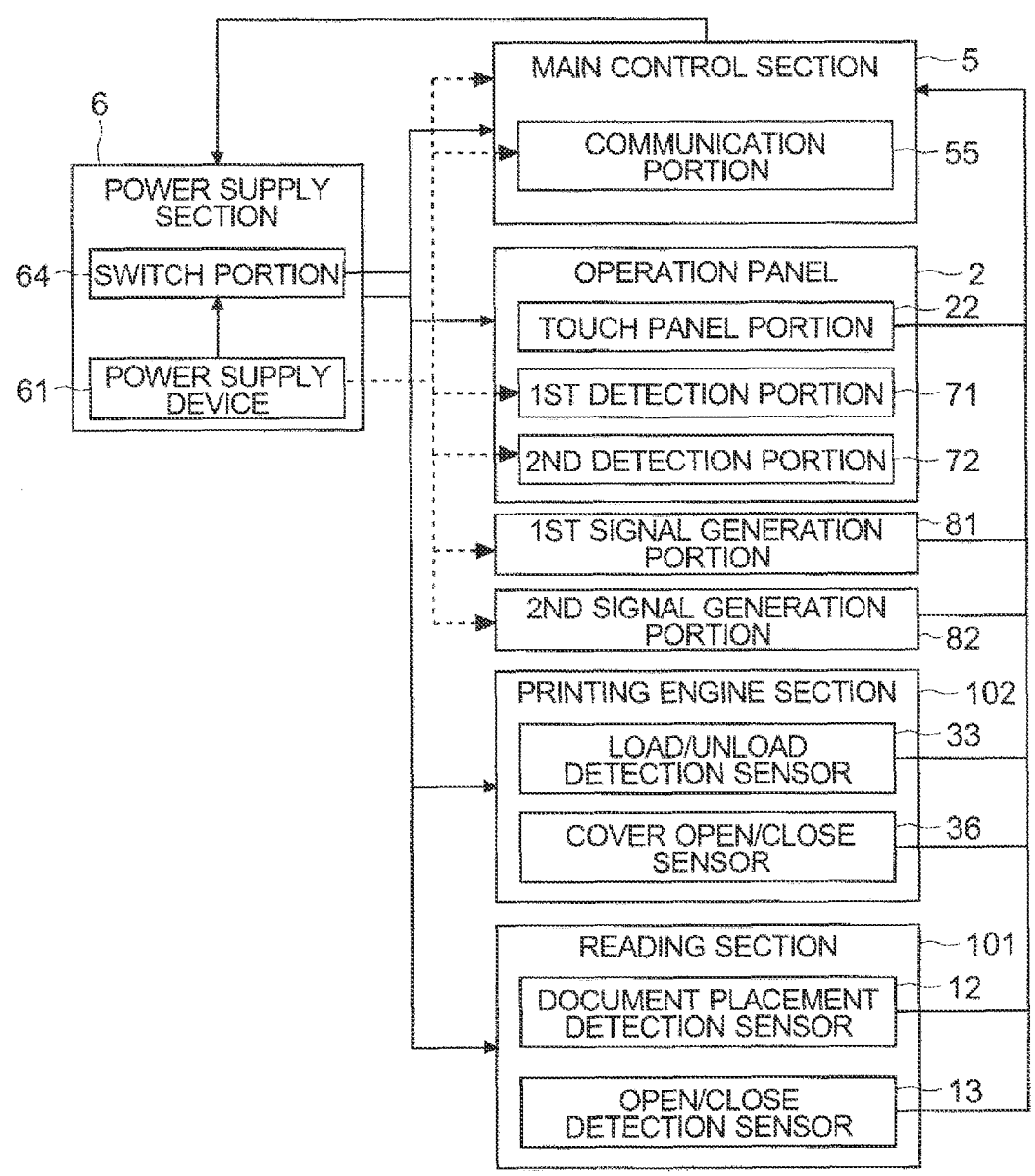
FIG. 3 is a diagram showing a flow of a power supply system of a multifunction product.

Next, with reference to FIG. 3, invocation and cancellation of power saving mode in a multifunction product 100 according to an embodiment will be described. FIG. 3 is a diagram showing the power supply system of the multifunction product 100.

The power supply device 61 in the power supply section 6 generates a plurality of voltages. Moreover, as shown in FIG. 3, the power supply section 6 includes the switch portion 64. The switch portion 64 includes a plurality of semiconductor switches, such as FETs or bipolar transistors, or mechanical switches, or the like. As the switch portion 64 is turned on and off, the supply of electric power to the reading section 101, the operation panel 2, the printing engine section 102, etc. is switched between on and off. In FIG. 3, the lines the supply of electric power across which can be turned on and off by the switch portion 64 are indicated by solid lines.

After, as a result of the main power supply being turned on, or power saving mode being canceled, normal mode goes into effect, whenever the conditions for invocation of power saving mode are fulfilled, the main control section 5 instructs the power supply section 6 to invoke power saving mode. The main control section 5 recognizes a human approaching the multifunction product 100, passing by it, or otherwise moving with respect to it according to a first signal S1 based on the output of a pyroelectric sensor 71a (see FIG. 4) and a second signal S2 based on the output of a pyroelectric sensor 72a and, based on the result of the recognition, checks whether or not the conditions for invocation of power saving mode are fulfilled.

The main control section 5 uses the first and second detection portions 71 and 72 which include the pyroelectric sensors in such a way that, when a human is recognized to be moving in a direction away (receding) from the image forming apparatus, the main control section 5 recognizes that the conditions for invocation of power saving mode are fulfilled (details will be given later).

When a user intends to do a job such as copying or scanning, he needs to make the multifunction product 100 read a document, and accordingly the user, with the document in his hand, moves toward the multifunction product 100. In this case, on completion of the job, the user moves away from the multifunction product 100.

However, there are also cases, as when printing is performed based on job execution data including image data received from the external computer 200 or the facsimile machine 300, where the multifunction product 100 executes a job without a human moving toward it. In such cases, the main control section 5 recognizes that the conditions for invocation of power saving mode are fulfilled when a predetermined transition period elapses with no human moving toward the multifunction product 100 after completion of execution of a job. The main control section 5 may also shift the multifunction product 100 into power saving mode when a power saving mode invoking key provided on the operation panel 2 is pressed.

On recognizing that the conditions for invocation of power saving mode are fulfilled, the main control section 5 instructs the power supply section 6 to invoke power saving mode. When so instructed, the power supply section 6 shifts the multifunction product 100 into power saving mode. To reduce electric power consumption, the power supply section 6 stops the supply of electric power to predetermined portions (power-supply-suspended portions) such as the operation panel 2, the printing engine section 102, the reading section 101, etc., thereby shifting the multifunction product 100 into power saving mode. In power saving mode, the multifunction product 100 is in a state unable to execute part of its jobs, such as copying, scanning, and transmission.

As indicated by broken lines in FIG. 3, to enable, even in power saving mode, recognition of whether a human is moving toward the multifunction product 100 or simply passing by in front of the multifunction product 100, electric power continues being supplied to the first detection portion 71, to a first signal generation portion 81, which processes the output of the first detection portion 71, to the second detection portion 72, to a second signal generation portion 82, which processes the output of the second detection portion 72, and to the main control section 5, which recognizes human movement direction based on the output signal (first signal S1) of the first signal generation portion 81 and the output signal (second signal S2) of the second signal generation portion 82. Also, to enable, even in power saving mode, reception of printing data from an external device such as the external computer 200, electric power continues being supplied to the communication portion 55 as well.

In power saving mode, to save power, the supply of electric power to part of the blocks in the main control section 5 is stopped; however, electric power continues being supplied to those portions of the main control section 5 which check whether or not the conditions for cancellation of power saving mode (restoration of normal mode) are fulfilled.

In power saving mode, on recognizing a human moving toward the multifunction product 100 based on the first and second signals S1 and S2, the main control section 5 determines that power saving mode should be canceled.

When power saving mode is canceled and normal mode is restored, the supply of electric power is restarted to those portions to which the supply of electric power has been stopped, namely the main control section 5, the reading section 101, the operation panel 2, the printing engine section 102, etc. These portions, to which the supply of electric power is now restarted, start a warming-up procedure to make the multifunction product 100 ready to execute jobs.

Conventionally, there are provided a plurality of portions that detect operation done on the multifunction product 100 (such as the operation panel 2, a touch panel portion 22 provided on the operation panel 2, a loading/unloading detection sensor 33, the cover open/close sensor 36, the document placement detection sensor 12, the open/close detection sensor 13, etc., which will hereinafter be referred to as "operation detection portions" for convenience' sake). Conventionally, whenever any of such operation detection portions detects operation done on an image forming apparatus, power saving mode is canceled.

Accordingly, even in power saving mode, electric power continues being supplied to the operation detection portions to keep them enabled. By contrast, according to the embodiment, it is when a human moves toward the multifunction product 100 that power saving mode is canceled; that is, in the multifunction product 100 according to the embodiment, no electric power is supplied to the operation detection portions. This helps reduce electric power consumption in the power saving mode as compared with the conventional norm.

(Detection Portions and Signal Generation Portions)

Figure 4:
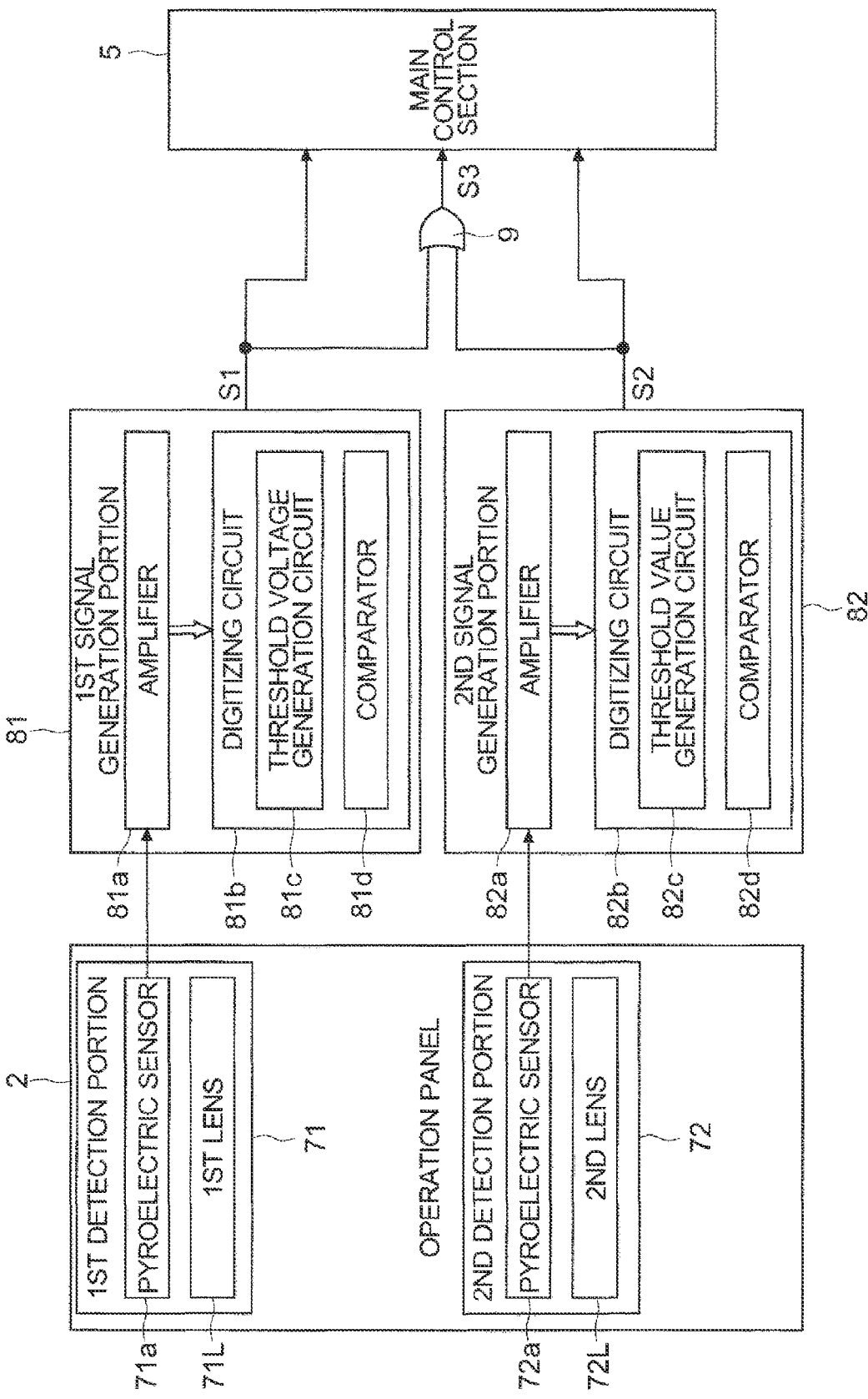
FIG. 4 is a diagram showing a flow of processing of the outputs of pyroelectric sensors.
Figure 5:
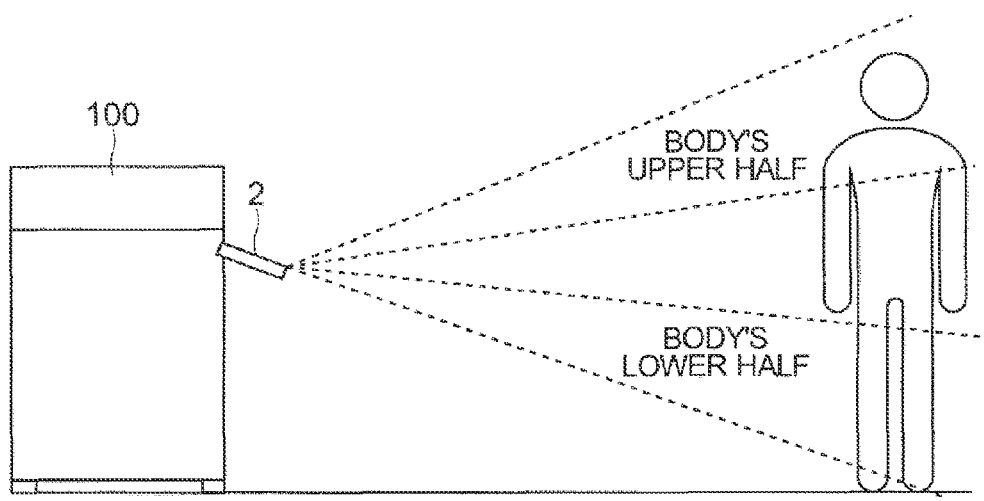
FIG. 5 is a diagram showing the detection areas of first and second detection portions.

Next, with reference to FIGS. 4 and 5, detection portions and signal generation portions according to an embodiment will be described. FIG. 4 is a diagram showing the flow of processing of the outputs of the pyroelectric sensors. FIG. 5 is a diagram showing the detection areas of the first and second detection portions 71 and 72.

As shown in FIG. 4, the image forming apparatus according to the embodiment is provided with a first detection portion 71 and a second detection portion 72. The first detection portion 71 includes a pyroelectric sensor 71a, and the second detection portion 72 includes the a pyroelectric sensor 72a. The pyroelectric sensors 71a and 72a are sensors that exploit the pyroelectric effect, whereby electric charge is produced by dielectric polarization on the surface of a dielectric when it is heated. The pyroelectric sensors 71a and 72a are pyroelectric-type infrared sensor of which the output voltages vary according to the amount of infrared radiation that they receive from the human body. In the embodiment, the pyroelectric sensors 71a and 72a are not of the type that emits infrared radiation, and therefore their electric power consumption is extremely low.

In the embodiment, the pyroelectric sensors 71a and 72a are provided on the operation panel 2. So that the pyroelectric sensors 71a and 72a can efficiently receive infrared radiation emanating from the user, they are provided in a front edge part of the operation panel 2 (see FIG. 1).

The first detection portion 71 includes a first lens 71L. The first lens 71L is a lens for setting the detection area of the pyroelectric sensor 71a. The second detection portion 72 includes a second lens 72L. The second lens 72L is a lens for setting the detection area of the pyroelectric sensor 72a. Used as the first and second lenses 71L and 72L are Fresnel lenses.

Now, with reference to FIG. 5, the detection areas of the first detection portion 71 (pyroelectric sensor 71a) and the second detection portion 72 (pyroelectric sensor 72a) will be described. As shown in FIG. 5, the detection area of the pyroelectric sensor 72a is set to be an area in which the upper half of the human body is detected. For example, the detection area of the pyroelectric sensor 71a is set by the first lens 71L to be a range of one meter or higher (to about several meters) relative to the floor surface.

On the other hand, as shown in FIG. 5, the detection area of the pyroelectric sensor 72a is set to be an area in which the lower half of the human body is detected. The detection area of the pyroelectric sensor 72a is set by the second lens 72L to be a range of several tens of centimeters or lower relative to the floor surface.

The output of the pyroelectric sensor 71a is fed to the first signal generation portion 81. The first signal generation portion 81 includes an amplifier 81a that amplifiers the output voltage of the pyroelectric sensor 71a. After being amplified by the amplifier 81a, the output of the pyroelectric sensor 71a is fed to a digitizing circuit 81b.

The digitizing circuit 81b generates a signal whose level varies according to whether the output value of the pyroelectric sensor 71a after amplification is greater than a predetermined threshold value or not. The digitizing circuit 81b includes a threshold voltage generation circuit 81c which generates a threshold voltage and a comparator 81d which compares the output value of the pyroelectric sensor 71a after amplification with the threshold value. In the embodiment, the digitizing circuit 81b outputs a high level while the output of the pyroelectric sensor 71a after amplification is greater than the threshold value, and outputs a low level while it is equal to or smaller than the threshold value. The logic levels of the high and low levels may be the other way around.

On the other hand, the output of the pyroelectric sensor 72a of the second detection portion 72 is fed to the second signal generation portion 82. The second signal generation portion 82 includes an amplifier 82a that amplifiers the output voltage of the pyroelectric sensor 72a. After being amplified by the amplifier 82a, the output of the pyroelectric sensor 72a is fed to a digitizing circuit 82b.

The digitizing circuit 82b generates a signal whose level varies according to whether the output value of the pyroelectric sensor 72a after amplification is greater than a predetermined threshold value or not. The digitizing circuit 82b includes a threshold voltage generation circuit 82c which generates a threshold voltage and a comparator 82d which compares the output value of the pyroelectric sensor 72a after amplification with the threshold value. The digitizing circuit 82b outputs a high level while the output of the pyroelectric sensor 72a after amplification is greater than the threshold value, and outputs a low level while it is equal to or smaller than the threshold value. The logic levels of the high and low levels may be the other way around.

As shown in FIG. 4, the first and second signal generation portions 81 and 82 may be provided outside the operation panel 2. The first and second signal generation portions 81 and 82 may instead be provided within the operation panel 2, or on a circuit board within the main control section 5; there is no particular restriction on where it is to be provided.

The first signal S1 generated by and fed out from the first signal generation portion 81 and the second signal S2 generated by and fed out from the second signal generation portion 82 are fed to the main control section 5. By using the first and second signals S1 and S2, the main control section 5 recognizes the direction of the user's movement.

(Movement Direction Recognition Based on the Waveforms of the First and Second Signals S1 and S2)

Now, with reference to FIGS. 6 and 7, a description will be given of movement direction recognition based on the waveforms of the first and second signals S1 and S2 according to a first embodiment. FIG. 6 is a timing chart showing the waveforms of the first and second signals S1 and S2 reflecting movement direction as observed in the multifunction product 100 according to the first embodiment. FIG. 7 is a diagram showing discrimination data D in the multifunction product 100 according to the first embodiment. Described below will be an example where the same lenses (lenses with equivalent characteristics) are used as the first and second lenses 71L and 72L of the first and second detection portions 71 and 72.

First, with reference to the relevant part of the timing chart shown in FIG. 6, the characteristics observed in the waveforms of the first and second signals S1 and S2 when a human is moving toward the multifunction product 100 (an approaching event) will be described.

In an approaching event, a human moving toward the multifunction product 100 is equivalent to a heat source (infrared radiation generation source) moving toward the sensors. Accordingly, the intensity and amount of infrared radiation incident on the pyroelectric sensor 71a for detecting the upper half of the human body gradually increase in relative terms. Reflecting this situation, based on the output of the pyroelectric sensor 71a for the upper half of the human body, the first signal generation portion 81 outputs the first signal S1 such that its high-level period becomes gradually long. In other words, in an approaching event, the pyroelectric sensor 71a, the first lens 71L, and the first signal generation portion 81 are so set that the duty factor of the second signal S2 gradually increases.

On the other hand, as the amount of infrared radiation received varies, the output of the pyroelectric sensor varies. In an approaching event, two feet advance alternately toward the pyroelectric sensor 72a for the lower half of the human body. Reflecting this situation, based on the output of the pyroelectric sensor 72a for the lower half of the human body, the second signal generation portion 82 outputs the second signal S2 such that it has a higher frequency and a shorter cycle than the first signal S1. In other words, in an approaching event, the pyroelectric sensor 72a, the second lens 72L, and the second signal generation portion 82 are so set that the second signal S2 has a higher frequency than the first signal S1.

By contrast, in a receding event, a human moving away from the multifunction product 100 is equivalent to a heat source (infrared radiation generation source) moving away. Accordingly, the intensity and amount of infrared radiation incident on the pyroelectric sensor 71a for detecting the upper half of the human body gradually decrease in relative terms. Reflecting this situation, based on the output of the pyroelectric sensor 71a for the upper half of the human body, the first signal generation portion 81 outputs the first signal S1 such that its high-level period becomes gradually short. In other words, in a receding event, the pyroelectric sensor 71a, the first lens 71L, and the first signal generation portion 81 are so set that the duty factor of the first signal S1 gradually decreases.

On the other hand, as the amount of infrared radiation received varies, the output of the pyroelectric sensor varies. In a receding event, the distances from the pyroelectric sensor 72a for the lower half of the human body to two feet gradually increase alternately. Reflecting this situation, based on the output of the pyroelectric sensor 72a for the lower half of the human body, the second signal generation portion 82 outputs the second signal S2 such that it has a higher frequency and a shorter cycle than the first signal S1. In other words, in a receding event, the pyroelectric sensor 72a, the second lens 72L, and the second signal generation portion 82 are so set that the second signal S2 has a higher frequency than the first signal S1.

When a user passes by in front of the multifunction product 100 (crossing the detection areas of the pyroelectric sensors) (a crossing event), the pyroelectric sensor 71a for detecting the upper half of the human body detects the swing of arms (hands). In other words, with respect to the pyroelectric sensor 71a, the arm swings at short intervals. The swing of the arm causes the infrared radiation incident on the pyroelectric sensor 71a to vary at short intervals. Reflecting the situation, in a crossing event, based on the output of the pyroelectric sensor 71a for the upper half of the human body, the first signal generation portion 81 generates the first signal S1 such that it has a higher frequency and a shorter cycle than the second signal S2. In other words, in a crossing event, the pyroelectric sensor 71a, the first lens 71L, and the first signal generation portion 81 are so set that the first signal S1 has a higher frequency than the second signal S2.

On the other hand, as a human crosses the detection areas, the angle from which the infrared radiation from the human body is incident on the pyroelectric sensor 72a varies from slant to head-on to slant, and when the angle is head-on relative to the pyroelectric sensor 72a for the lower half of the human body, the infrared radiation is most efficiently incident on the pyroelectric sensor 72a. Thus, based on the output of the pyroelectric sensor 72a for the lower half of the human body, the second signal generation portion 82 generates the second signal S2 such that the high-level period becomes first gradually long and then, after the peak is reached (when the human body is right in front of the pyroelectric sensor), increasingly short. In other words, in a crossing event, the second detection portion 72, the second lens 72L, and the second signal generation portion 82 are so set that the duty factor of the second signal S2 first increases and then decreases.

As described above, human movement with respect to the multifunction product 100 can produce, in the variation patterns of the first and second signals S1 and S2 and in the relationships between them in terms of frequency and cycle, characteristics so distinctive as to allow discrimination of whether a human is approaching, receding, or crossing.

Accordingly, as shown in FIG. 7, as discrimination data D for recognizing and discriminating human movement direction (approaching, recessing, or crossing), it is possible to define variation patterns of the first and second signals S1 and S2 and relationships between them in terms of frequency and cycle. The discrimination data D is preferably stored in the storage portion 52.

As shown in FIG. 7, as a condition for recognizing a human approaching the multifunction product 100, based on the above-described characteristics of the relevant signals in an approaching event, it is possible to define, in the discrimination data D, conditions that the frequency f1 of the first signal S1 is lower than the frequency f2 of the second signal S2 (the cycle T1 of the first signal S1 is longer than the cycle T2 of the second signal S2) and that the high-level period Th1 of the first signal S1 is becoming gradually long (the duty factor of the first signal S1 is increasing).

Moreover, as shown in FIG. 7, as a condition for recognizing a human receding from the multifunction product 100, based on the above-described characteristics of the relevant signals in a receding event, it is possible to define, in the discrimination data D, conditions that the frequency f1 of the first signal S1 is lower than the frequency f2 of the second signal S2 (the cycle T1 of the first signal S1 is longer than the cycle T2 of the second signal S2) and that the high-level period Th1 of the first signal S1 is becoming gradually short (the duty factor of the first signal S1 is decreasing).

Moreover, as shown in FIG. 7, as a condition for recognizing a human passing by in front of the multifunction product 100 (crossing the detection areas of the pyroelectric sensors), based on the above-described characteristics of the relevant signals in a crossing event, it is possible to define, in the discrimination data D, a condition that the frequency f1 of the first signal S1 is higher than the frequency f2 of the second signal S2 (the cycle T1 of the first signal S1 is shorter than the cycle T2 of the second signal S2) and that the high-level period Th2 of the second signal S2 becomes first increasingly long and then increasingly short (the duty factor of the second signal S2 first increases and then decreases).

Based on the discrimination data D described above, to recognize human movement direction, as shown in FIG. 6, the main control section 5 (the CPU 51 and the clock portion 54) measures the cycle T1 and the high-level period Th1 of the first signal S1. Based on the measured cycle T1, the main control section 5 can calculate the frequency f1 of the first signal S1. By dividing the high-level period Th1 of the first signal S1 by its cycle T1, the main control section 5 can calculate the duty factor of the first signal S1.

Likewise, the main control section 5 (the CPU 51 and the clock portion 54) measures the cycle T2 and the high-level period Th2 of the second signal S2. Based on the measured cycle T2, the main control section 5 can calculate the frequency f2 of the second signal S2. By dividing the high-level period Th2 of second signal S2 by its cycle T2, the main control section 5 can calculate the duty factor of the second signal S2.

Then, based on the cycle T1, the frequency f1, and the high-level period Th1 of the first signal S1, the cycle T2, the frequency f2, and the high-level period Th2 of the second signal S2, and the discrimination data D, the main control section 5 recognizes human movement direction.

(Switching of Power Saving Mode According to Human Movement Direction)

Figure 8:
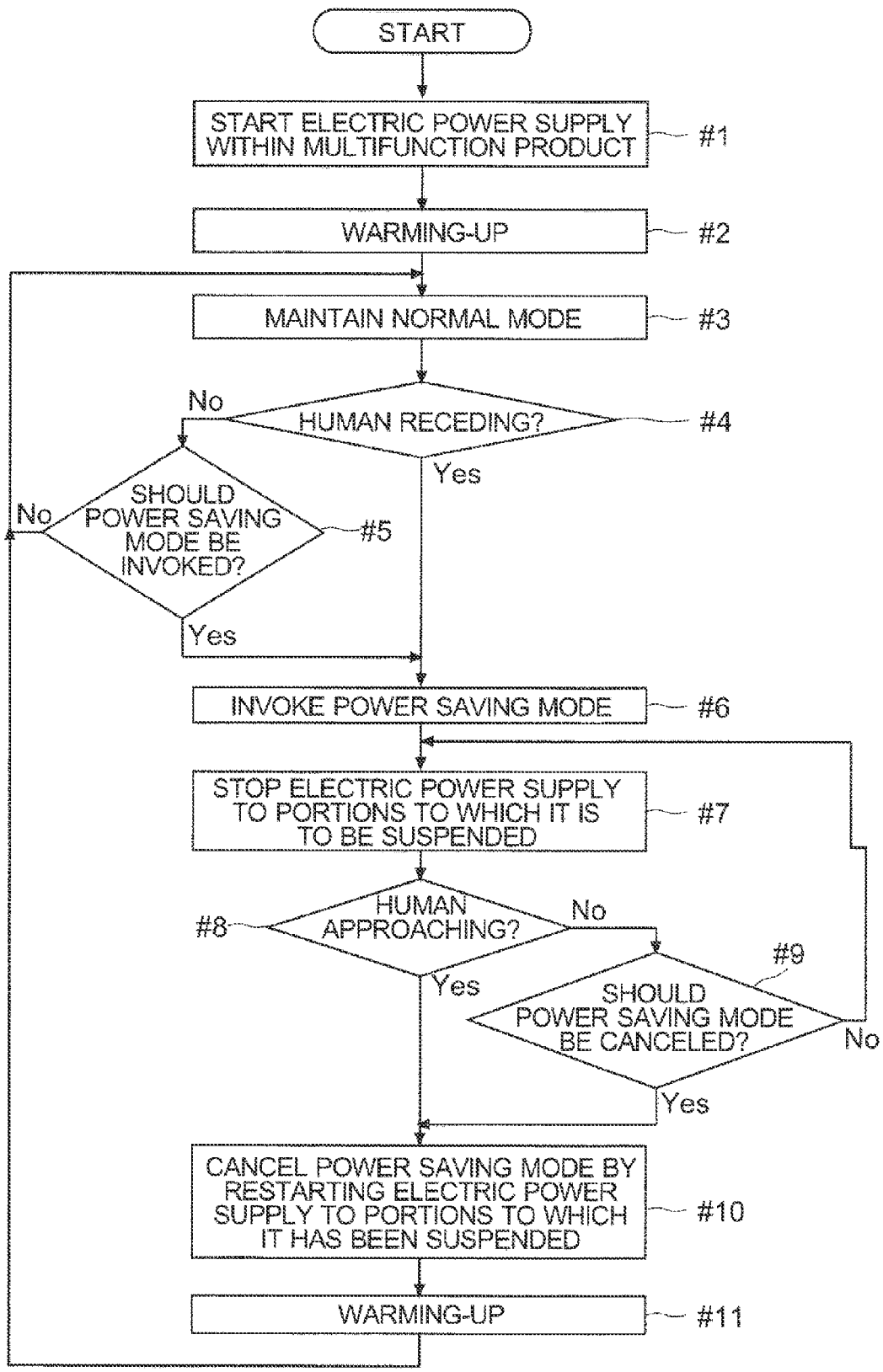
FIG. 8 is a flow chart showing a flow of control for switching power saving mode according to human movement direction in a multifunction product.

Next, with reference to FIG. 8, a description will be given of the flow of control for the switching of power saving mode according to human movement direction in the multifunction product 100. FIG. 8 is a flow chart showing the flow of control for the switching of power saving mode according to human movement direction in the multifunction product 100.

The flow of FIG. 8 starts when the main power supply to the multifunction product 100 is turned on. A switch for turning on the main power supply is provided on the operation panel 2, or on a side face of the multifunction product 100. The user can, by operating the switch to an on position, turn on the power to the multifunction product 100 and, by operating the switch to an off position, turn off the power to the multifunction product 100.

When the main power supply is turned on, the power supply section 6 starts the supply of electric power within the multifunction product 100, to the main control section 5, the reading section 101, the printing engine section 102, the operation panel 2, etc. (step #1). Now, electric power is supplied to all the portions within the multifunction product 100, and a warming-up procedure is performed to make the multifunction product 100 ready to operate (step #2). Through the warming-up procedure, the main control section 5, the reading section 101, and the operation panel 2 are started up, and in the printing engine section 102, toner is stirred, the fusing section 4b is heated, and other preparations are made. When the main power supply is turned on, through the warming-up procedure, the multifunction product 100 is started up in normal mode, in which all of its functions are readily available. The control section 1 lets the power supply section 6 continue the supply of electric power to the portions to which the supply of electric power can be suspended, and thereby keeps the multifunction product 100 in normal mode (step #3).

Subsequently, based on the first and second signals S1 and S2 and the discrimination data D, the main control section 5 checks whether or not a user is moving away (receding) from the multifunction product 100 (step #4). Specifically, the main control section 5 measures the cycles of the first and second signals S1 and S2 and the periods for which they are high, and checks whether or not the measured results meet the conditions defined in the discrimination data D for recognizing a human moving away.

When it is not recognized that a human is moving away (step #4, "No"), the main control section 5 checks whether or not to invoke power saving mode (step #5). Scanning, copying, and other jobs involve a human approaching and receding from the multifunction product 100; by contrast, jobs such as a printer job and a job of transmitting image data stored in the storage portion 52 can trigger cancellation of power saving mode with no human approaching the multifunction product 100. After completion of the warming-up procedure, or after completion of execution of a job, the main control section 5 checks whether or not a predetermined transition period elapses with no human approaching the multifunction product 100 and no input of job execution data reaching the communication portion 55. When power saving mode should not be invoked (step #5, "No"), the flow returns to step #3.

By contrast, when a human is moving away from the multifunction product 100 (step #4, "Yes"), or when power saving mode should be invoked (step #5, "Yes"), the main control section 5 instructs the power supply section 6 to invoke power saving mode (step #6). When so instructed, the power supply section 6 stops the supply of electric power to the predetermined portions to which the supply of electric power should now be stopped, while continuing the supply of electric power to part of the first and second signal generation portions 81 and 82 (step #7) etc.

Then, based on the first and second signals S1 and S2 and the discrimination data D, the main control section 5 checks whether or not a human is approaching (moving toward) the multifunction product 100 (step #8). Specifically, the main control section 5 measures the cycles of the first and second signals S1 and S2 and the periods for which they are high, and checks whether or not the measured results meet the conditions defined in the discrimination data D for recognizing a human approaching.

When it is not recognized that a human is approaching the multifunction product 100 (step #8, "No"), the main control section 5 checks whether or not to cancel power saving mode (step #9). For example, the main control section 5 checks whether or not job execution data (data containing data commanding execution of a job and image data related to the job to be executed) has been received via the communication portion 55 from the external computer 200, the facsimile machine 300, or the like. When power saving mode should be maintained (step #9, "No"), the flow returns to step #7.

On the other hand, when it is recognized that a human is moving toward the multifunction product 100 (step #8, "Yes"), or when power saving mode should be canceled (step #9, "Yes"), the main control section 5 lets the main control section 5 restart the supply of electric power to the portions to which the supply of electric power has been stopped in power saving mode, and thereby cancels power saving mode (step #10). As a result, in the multifunction product 100, the warming-up procedure is started in the portions to which the supply of electric power is restarted, namely the printing engine section 102, etc. (step #11). The flow then returns to FIG. 3. In this way, the main control section 5 recognizes, with a clear distinction, whether a human is moving toward the multifunction product 100 or is crossing the detection areas. Thus, a human simply entering the detection areas of the pyroelectric sensors as by crossing them does not trigger the main control section 5 to instruct the power supply section 6 to cancel power saving mode.

The upper and lower halves of the human body move in different manners. Also, between when a human is moving toward the image forming apparatus (multifunction product 100) and when a human is crossing the detection areas, the human body has different angles with respect to the pyroelectric sensors. For these reasons, in the waveforms of the first and second signals S1 and S2, such characteristics (conditions) can appear as allow discrimination of movement direction. Accordingly, the image forming apparatus (multifunction product 100) according to the first embodiment includes: a first detection portion 71 including a pyroelectric sensor 71a, for detecting the upper half of the human body; a first signal generation portion 81 that receives the output of the pyroelectric sensor 71a of the first detection portion 71 to generate a first signal S1 whose level varies according to whether or not the output value of the pyroelectric sensor 71a of the first detection portion 71 is greater than a predetermined threshold value; a second detection portion 72 including a pyroelectric sensor 72a, for detecting an area lower than the first detection portion 71 to detect the lower half of the human body; a second signal generation portion 82 that receives the output of the pyroelectric sensor 72a of the second detection portion 72 to generate a second signal S2 whose level varies according to whether or not the output of the pyroelectric sensor 72a of the second detection portion 72 is greater than a predetermined threshold value; a storage portion 52 for storing discrimination data D including data defining, with respect to the waveforms of the first and second signals S1 and S2, a condition for recognizing a human moving toward the image forming apparatus (multifunction product 100) and a condition for recognizing a human (user) is crossing the detection areas of the pyroelectric sensors; and a recognition portion (main control section 5) for recognizing the direction of movement of the human with respect to the image forming apparatus (multifunction product 100) by recognizing, based on the waveforms of the first and second signals S1 and S2 and the discrimination data D, whether a human is moving toward the image forming apparatus (multifunction product 100) and whether a human is crossing the detection areas of the pyroelectric sensors.

Thus, based on the characteristics of the waveform of the first signal S1 which varies according to the movement of the upper half of the human body and the characteristics of the waveform of the second signal S2 which varies according to the movement of the lower half of the human body, it is possible to accurately discriminate/distinguish whether a human is moving closer or passing by. It is thus possible to accurately recognize/detect, not simply whether or not a human is present within the detection areas, but the direction of movement of a human with respect to the image forming apparatus (multifunction product 100).

The upper and lower halves of the human body move in different manners. Also, while the amount and intensity of infrared radiation incident on the pyroelectric sensors from the human body as a human moves toward the image forming apparatus (multifunction product 100) (the heat radiated from the human to the pyroelectric sensors) increase, the amount and intensity of infrared radiation incident on the pyroelectric sensors from the human body as a human is moving away decrease. For these reasons, in the waveforms of the first and second signals S1 and S2, such characteristics (conditions) can appear as allow discrimination of movement direction, namely moving closer or moving away. Accordingly, with respect to the waveforms of the first and second signals S1 and S2, the storage portion 52 stores, in discrimination data D, data defining a condition for recognizing a human moving away from the image forming apparatus, and, based on the waveforms of the first and second signals S1 and S2 and the discrimination data D, the recognition portion (main control section 5) recognizes whether or not a human is moving away from the image forming apparatus. Thus, based on the characteristics of the waveforms of the first and second signals S1 and S2, it is possible to accurately recognize even whether a human is moving away. It is thus possible to accurately recognize/detect, not simply whether or not a human is present within the detection areas, but the direction of movement of a human with respect to the image forming apparatus (multifunction product 100).

When power saving mode is not in effect and the recognition portion (main control section 5) recognizes a human moving away from the image forming apparatus (multifunction product 100), the power supply section 6 supplies electric power only to part of the image forming apparatus (multifunction product 100) to shift the image forming apparatus (multifunction product 100) into power saving mode; when power saving mode is in effect and the recognition portion (main control section 5) recognizes a human moving toward the image forming apparatus (multifunction product 100), the power supply section 6 restarts the supply of electric power to all or part of the portions to which the supply of electric power has been stopped in power saving mode, and thereby cancels power saving mode; when the recognition portion (main control section 5) recognizes a human passing by, the power supply section 6 does not switch the mode of electric power supply. Thus, when a human is moving toward the image forming apparatus (multifunction product 100) to use it, the image forming apparatus (multifunction product 100) is shifted out of power saving mode. Accordingly, when a human reaches in front of the image forming apparatus (multifunction product 100), power saving mode has been canceled and the supply of electric power has been restarted to the relevant portions; thus, the human can make the image forming apparatus (multifunction product 100) execute a job with almost no wait. On the other hand, when a human is moving away from the image forming apparatus (multifunction product 100), the image forming apparatus (multifunction product 100) is shifted into power saving mode. Accordingly, whenever the image forming apparatus goes into an unused state, it can immediately be shifted into power saving mode, and this helps greatly reduce the electric power consumption of the image forming apparatus (multifunction product 100). Moreover, even a human passing by can be accurately discriminated/recognized, and thus power saving mode is not erroneously canceled, permitting the image forming apparatus (multifunction product 100) to remain in a power saving state as long as possible.

Due to the difference between the movement of the upper and lower halves of the human body, and due to the varying angles of the human body relative to the pyroelectric sensors, the waveforms of the first and second signals S1 and S2 vary according to whether a human is moving toward, moving away from, or passing by the image forming apparatus (multifunction product 100). The first and second signals S1 and S2 exhibit a signal variation pattern that appears only when a human is moving toward the image forming apparatus, a signal variation pattern that appears only when a human is moving away from it, and a signal variation pattern that appears only when a human is passing by it. Accordingly, the storage portion 52 stores as the discrimination data D that defines variation patterns of the first and second signals S1 and S2; the recognition portion (main control section 5) recognizes the variation pattern of the first and second signals S1 and S2 and, by checking whether or not it agrees with one defined in the discrimination data D, recognizes human movement direction. It is thus possible to correctly recognize the direction of movement of a human with respect to the image forming apparatus.

Due to the difference between the movement of the upper and lower halves of the human body, and due to the varying angles of the human body relative to the pyroelectric sensors, the relationships between the first and second signals S1 and S2 in terms of frequency and cycle can vary according to whether a human is moving toward, moving away from, or passing by the image forming apparatus (multifunction product 100). In other words, there are cases where it is possible, based on the relationships between the first and second signals S1 and S2 in terms of frequency and cycle, to discriminate whether a human is moving toward, moving away from, or passing by the image forming apparatus. Accordingly, the storage portion 52 stores as the discrimination data D defining the relationships between the first and second signals S1 and S2 in terms of frequency or cycle; the recognition portion (main control section 5) calculates the frequencies or cycles of the first and second signals S1 and S2 and, based on the discrimination data D and the calculated frequencies or cycles, recognizes human movement direction. It is thus possible to correctly recognize the direction of movement of a human with respect to the image forming apparatus.

Moreover, in the first embodiment, for the pyroelectric sensor 71a of the first detection portion 71, the first lens 71L is provided, and for the pyroelectric sensor 72a of the second detection portion 72, the second lens 72L is provided. The first and second lenses 71L and 72L are lenses with equivalent characteristics. Moreover, in the discrimination data D, there are defined, as a condition for discriminating a human approaching the image forming apparatus (multifunction product 100), conditions that the frequency f1 of the first signal S1 is lower than the frequency f2 of the second signal S2 (that is, the cycle of the first signal S1 is longer than the cycle T2 of the second signal S2 and that the duty factor of the first signal S1 is increasing; as a condition for discriminating a human moving away from the image forming apparatus, conditions that the frequency f1 of the first signal S1 is lower than the frequency f2 of the second signal S2 (the cycle T1 of the first signal S1 is longer than the cycle T2 of the second signal S2) and that the duty factor of the first signal S1 is decreasing; as a condition for discriminating a human passing by, conditions that the frequency f1 of the first signal S1 is higher than the frequency f2 of the second signal S2 and that the duty factor of the second signal S2 first increases and decreases. This makes it possible to accurately recognize the direction of movement of a human.

Second Embodiment

Next, with reference to FIGS. 4, 9, and 10, a second embodiment will be described. FIG. 9 is a timing chart showing the waveforms of the first and second signals S1 and S2 reflecting movement direction as observed in the multifunction product 100 according to the second embodiment. FIG. 10 is a diagram showing discrimination data D in the multifunction product 100 according to the second embodiment.

In this embodiment, the first lens 71L of the first detection portion 71 and the second lens 72L of the second detection portion 72 are made different so that, for each of the cases where a human is approaching, receding from, and passing by the multifunction product 100, the first and second signals S1 and S2 are given different waveforms than in the first embodiment. In other respects, a configuration similar to that in the first embodiment can be adopted. Accordingly, with respect to common features, the relevant parts of the description of the first embodiment are to be referred to, and no overlapping description or illustration will be given unless necessary.

One difference of the second embodiment from the first embodiment is that, by giving the first and second lenses 71L and 72L different focal lengths (for example, by giving the first lens 71L a shorter focal length and the second lens 72L a longer focal length than the first lens 71L so that the second lens 72L receives infrared radiation in an intentionally wider range on average), or by designing them to transmit different amounts of infrared radiation, or by giving the first and second detection portions 71 and 72 different detection areas, or by adjusting threshold value, the outputs of the respective pyroelectric sensors are so adjusted that the first and second signals S1 and S2 have output waveforms in the discrimination data D to each other.

A human moving toward the multifunction product 100 is equivalent to a heat source (infrared radiation generation source) moving toward it. Accordingly, in this embodiment, in an approaching event, the lenses, the first and second detection portions 71 and 72, and the first and second signal generation portions 81 and 82 are so set that the high-level periods of the first signal S1 based on the pyroelectric sensor 71a detecting the upper half of the human body and the second signal S2 based on the pyroelectric sensor 72a detecting the lower half of the human body both become gradually long.

A human moving away from the multifunction product 100 is equivalent to a heat source (infrared radiation generation source) moving away from it. Accordingly, in this embodiment, in a receding event, the lenses, the first and second detection portions 71 and 72, and the first and second signal generation portions 81 and 82 are so set that the high-level periods of the first signal S1 based on the pyroelectric sensor 71a detecting the upper half of the human body and the second signal S2 based on the pyroelectric sensor 72a detecting the lower half of the human body both become gradually short.

By adjusting the first lens 71L, it is possible to set the first detection portion 71 so that the pyroelectric sensor 71a for detecting the upper half of the human body detects the swing of arms (hands) when a human passes by in front of the multifunction product 100 (crossing the detection areas of the pyroelectric sensors). Likewise, by adjusting the second lens 72L, it is possible to set the second detection portion 72 so that the pyroelectric sensor 72a for detecting the lower half of the human body detects the swing of legs when a human passes by in front of the multifunction product 100 (crossing the detection areas of the pyroelectric sensors). By exploiting the fact that the swing of hands causes the infrared radiation incident on the document transport section 1a to vary and the fact that the swing of the leg causes the infrared radiation incident on the pyroelectric sensor 72a to vary, the first and second signal generation portions 81 and 82 generate the first and second signals S1 and S2 with higher frequencies (with shorter cycles) than in an approaching or recessing event. In other words, the first and second detection portions 71 and 72 and the first and second signal generation portions 81 and 82 are so set that the frequencies of the first and second signals S1 and S2 in a crossing event are significantly higher than in an approaching or recessing event.

As described above, also in this embodiment, as a human moves with respect to the multifunction product 100, in the variation patterns of the first and second signals S1 and S2 and in the relationships between them in terms of frequency and cycle, characteristics can appear that are so striking as to allow discrimination of whether a human is approaching, receding, or passing by.

Accordingly, as shown in FIG. 10, in the discrimination data D for recognition/discrimination of human movement direction (approaching, recessing, or crossing), it is possible to define waveform variation patterns of the first and second signals S1 and S2 and relationships between them in terms of frequency and cycle. The discrimination data D is preferably stored in the storage portion 52.

As shown in FIG. 10, as a condition for discriminating a human approaching the multifunction product 100, based on the above-mentioned characteristics of the relevant signals in an approaching event, it is possible to define, in the discrimination data D, a condition that the high-level periods of the first and second signals S1 and S2 are both becoming gradually long (the duty factors of the first and second signals S1 and S2 are increasing). The main control section 5 checks whether or not the high-level periods of the first and second signals S1 and S2 become longer several consecutive times.

As shown in FIG. 10, as a condition for discriminating a human moving away from the multifunction product 100, based on the above-mentioned characteristics of the relevant signals in a receding event, it is possible to define, in the discrimination data D, a condition that the high-level periods of the first and second signals S1 and S2 are both becoming gradually short (the duty factors of the first and second signals S1 and S2 are decreasing). The main control section 5 checks whether or not the high-level periods of the first and second signals S1 and S2 both become shorter several consecutive times.

As shown in FIG. 10, as a condition for discriminating a human passing by in front of the multifunction product 100 (crossing the detection areas of the pyroelectric sensors), based on the above-mentioned characteristics of the relevant signals in a crossing event, it is possible to define, in the discrimination data D, a condition that the frequencies f1 and f2 of the first and second signals S1 and S2 are higher than a prescribed frequency fa (the cycles T1 and T2 of the first and second signals S1 and S2 are shorter than a prescribed cycle Ta) can be defined. The frequency fa is a frequency higher than the frequencies in an approaching or receding event, and is a frequency that is considered to signify passing by (a frequency as is detected in a crossing event). The prescribed cycle Ta is a cycle shorter than the cycles in an approaching or receding event, and is a cycle that is considered to signify passing by (a cycle as is detected in a crossing event).

As shown in FIG. 9, the main control section 5 (the CPU 51 and the clock portion 54) measures the cycle T1 and the high-level period Th1 of the first signal S1. Based on the measured cycle T1, the main control section 5 can calculate the frequency f1 of the first signal S1. Moreover, by dividing the high-level period Th1 of the first signal S1 by its cycle T1, the main control section 5 can calculate the duty factor of the first signal S1.

Likewise, as shown in FIG. 9, the main control section 5 (the CPU 51 and the clock portion 54) measures the cycle T2 and the high-level period Th2 of the second signal S2. Based on the measured cycle T2, the main control section 5 can calculate the frequency f2 of the second signal S2. Moreover, by dividing the high-level period Th2 of the second signal S2 by its cycle T2, the main control section 5 can calculate the duty factor of the second signal S2.

Also in this embodiment, by using the cycle T1, the frequency f1, and the high-level period Th1 of the first signal S1, the cycle T2, the frequency f2, and the high-level period Th2 of the second signal S2, and the discrimination data D, the main control section 5 can recognize human movement direction.

As described above, in the second embodiment, the first detection portion 71, the first signal generation portion 81, the second detection portion 72, and the second signal generation portion 82 are so adjusted that the output waveforms of the first and second signals S1 and S2 are closer to each other. Moreover, in the discrimination data D, there are defined, as the condition for discriminating a human approaching the image forming apparatus (multifunction product 100), a condition that the duty factors of the first and second signals S1 and S2 are increasing; as the condition for discriminating a human receding from the image forming apparatus, a condition that the duty factors of the first and second signals S1 and S2 are decreasing; and as the condition for discriminating a human passing by, a condition that the frequencies f1 and f2 of the first and second signals S1 and S2 are higher than a previous determined frequency fa (that is, the cycles T1 and T2 of the first and second signals S1 and S2 are both shorter than a prescribed cycle Ta). It is thus possible to accurately recognize human movement direction.

Furthermore, in this embodiment, the first and second detection portions 71 and 72 are so adjusted that the waveforms of the first and second signals S1 and S2 are closer to each other. Accordingly, as shown in FIG. 4, a synthesized signal generating portion 9 for synthesizing the first and second signals S1 and S2 together may be provided. FIG. 4 shows an example where, as the synthesized signal generating portion 9, an OR circuit is provided. Human movement direction (approaching, recessing, or crossing) may then be recognized/discriminated according to the so synthesized signal S3.

In FIG. 9, the timing chart shows the waveform of the synthesized signal S3 resulting from synthesis of the first and second signals S1 and S2 in each of approaching, receding, and crossing events. According to the direction of movement of a human approaching, receding from, or passing by the multifunction product 100, similar characteristics appear in the waveform of the synthesized signal S3 as well. Accordingly, also for the synthesized signal S3, conditions for determining whether a human is approaching, receding from, or passing by the multifunction product 100 may be included in the discrimination data D.

For example, as shown in FIG. 10, as a condition for discriminating a human approaching the multifunction product 100, based on the above-mentioned characteristics of the synthesized signal S3 in an approaching event that are similar to those of the first and second signals S1 and S2, it is possible to define, in the discrimination data D, a condition that the high-level period of the synthesized signal S3 is becoming increasingly long (the duty factor of the synthesized signal S3 is increasing). The main control section 5 checks whether or not the high-level period Th3 of the synthesized signal S3 becomes longer several consecutive times.

As shown in FIG. 10, as a condition for discriminating a human receding from the multifunction product 100, based on the above-mentioned characteristics of the synthesized signal S3 in a receding event that are similar to those of the first and second signals S1 and S2, it is possible to define, in the discrimination data D, a condition that the high-level period of the synthesized signal S3 is becoming increasingly short (the duty factor of the synthesized signal S3 is decreasing). The main control section 5 checks whether or not the high-level period Th3 of the synthesized signal S3 becomes shorter several consecutive times.

As shown in FIG. 10, as a condition for discriminating a human passing by in front of the multifunction product 100 (crossing the detection areas of the pyroelectric sensors), based on the above-mentioned characteristics of the synthesized signal S3 in a crossing event that are similar to those of the first and second signals S1 and S2, it is possible to define, in the discrimination data D, a condition that the frequency of the synthesized signal S3 is higher than a frequency fa prescribed as a frequency that can be regarded as higher than the frequency in an approaching or receding event.

To enable recognition of human movement direction based on the discrimination data D for the synthesized signal S3, the main control section 5 (the CPU 51 and the clock portion 54) can feed the synthesized signal S3 from the synthesized signal generating portion 9 to the main control section 5 (see FIG. 6). According to the synthesized signal S3, the main control section 5 measures the cycle T3 and the high-level period Th3 of the synthesized signal S3. Based on the measured cycle T3, the main control section 5 can calculate the frequency f3 of the synthesized signal S3. Moreover, by dividing the high-level period Th3 of the synthesized signal S3 by its cycle T3, the main control section 5 can calculate the duty factor of the synthesized signal S3.

Thus, also by busing the cycle T3, the frequency f3, and the high-level period Th3 of the synthesized signal S3 and the discrimination data D, the main control section 5 can recognize human movement direction. The main control section 5 can recognize human movement direction based on the first and second signals S1 and S2 and separately recognize human movement direction based on the synthesized signal S3 so as to conclude, when the two recognition results agree, that a human is moving closer, moving away, or passing by. Instead, the main control section 5 may recognize human movement direction based on the first and second signals S1 and S2 alone, or may recognize human movement direction based on the synthesized signal S3 alone.

Third Embodiment

Figure 11:
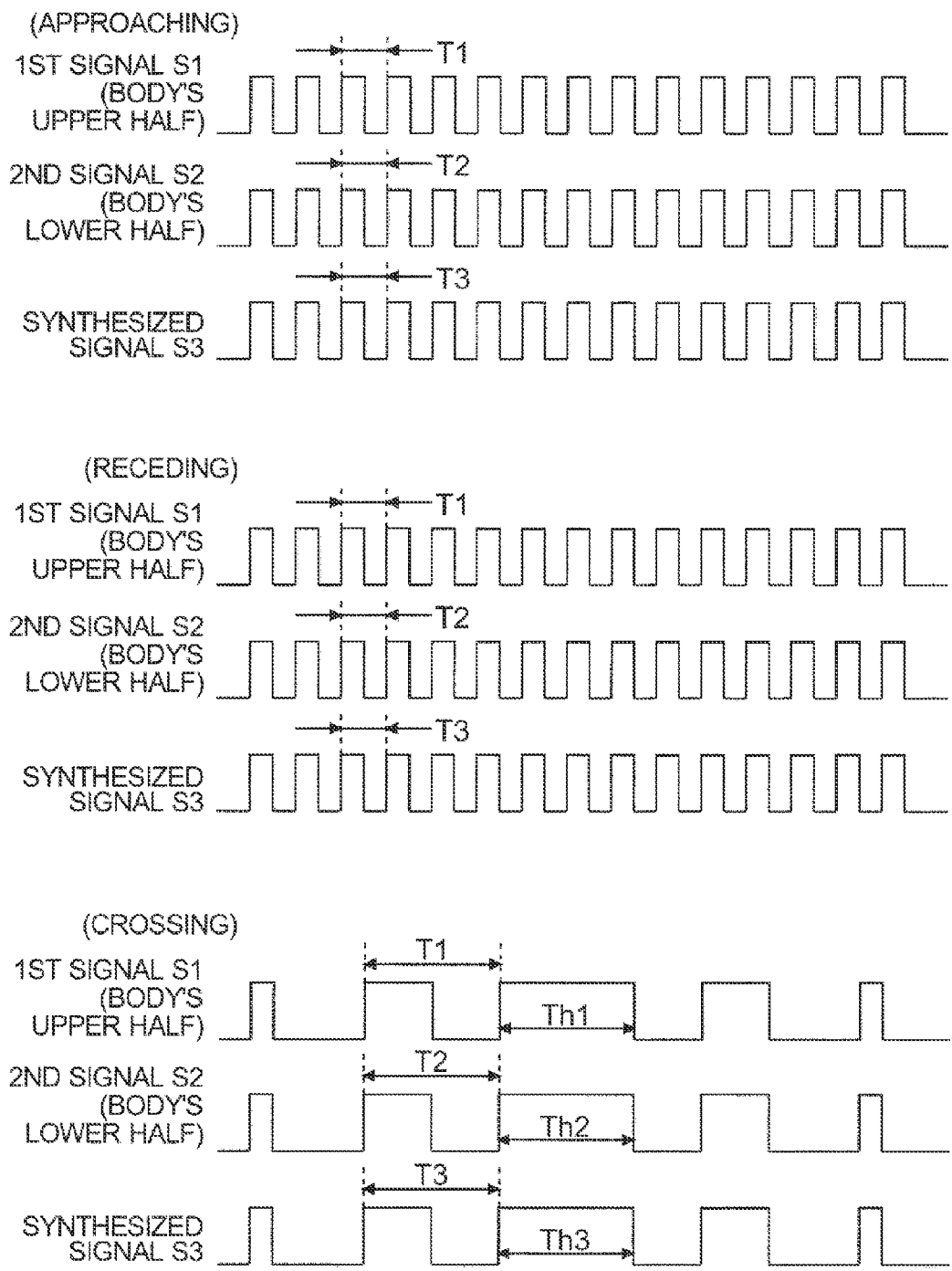
FIG. 11 is a timing chart showing the waveforms of relevant signals according to movement direction in a multifunction product according to a third embodiment.

Next, with reference to FIGS. 11 and 12, a third embodiment will be described. FIG. 11 is a timing chart showing the waveforms of the relevant signals reflecting movement direction as observed in the multifunction product 100 according to the third embodiment. FIG. 12 is a diagram showing discrimination data D in the multifunction product 100 according to the third embodiment.

In this embodiment, the first lens 71L of the first detection portion 71 and the second lens 72L of the second detection portion 72 are made different so that, for each of the cases where a human is approaching, receding from, and passing by the multifunction product 100, the waveforms of the first and second signals S1 and S2 are adjusted to be different than in the first embodiment. In other respects, a configuration similar to those in the first and second embodiments can be adopted. Accordingly, with respect to common features, the relevant parts of the description of the first and second embodiments are to be referred to, and no overlapping description or illustration will be given unless necessary.

One difference of the third embodiment from the first embodiment is that, by giving the first and second lenses 71L and 72L different focal lengths, or by adjusting the amounts of infrared radiation incident on the sensors, or by giving the first and second detection portions 71 and 72 different detection areas, or by adjusting the threshold values, the outputs of the respective pyroelectric sensors are so adjusted that the first and second signals S1 and S2 have output waveforms closer to each other.

Specifically, in the multifunction product 100 according to the third embodiment, the lenses, the first and second detection portions 71 and 72, and the first and second signal generation portions 81 and 82 are so set that the frequencies of the first and second signals S1 and S2 in approaching and receding events are higher than their frequencies in a crossing event. In other words, the lenses, the first and second detection portions 71 and 72, and the first and second signal generation portions 81 and 82 are so set that the cycles of the first and second signals S1 and S2 when a human moves toward or away from the image forming apparatus are shorter than their cycles when a human crosses it.

Moreover, in the multifunction product 100 according to the third embodiment, the first and second detection portions 71 and 72 and the first and second signal generation portions 81 and 82 are so set that, in a crossing event, the high-level periods Th1 and Th2 of the first and second signals S1 and S2 first become increasingly long and then increasingly short (the duty factors of the first and second signals S1 and S2 first increase and then decrease).

As described above, also in this embodiment, based on characteristics that appear in the variation patterns of the first and second signals S1 and S2 and in the relationships between them in terms of frequency and cycle, it can be possible to discriminate whether a human is approaching or crossing.

Accordingly, as shown in FIG. 12, in the discrimination data D for recognizing/discriminating human movement direction (approaching, recessing, or crossing), it is possible to define waveform variation patterns of the first and second signals S1 and S2 and relationships between them in terms of frequency and cycle. The discrimination data D is preferably stored in the storage portion 52.

As shown in FIG. 12, as a condition for discriminating a human moving toward or away from the multifunction product 100, based on the above-mentioned characteristics of the relevant signals in approaching and receding events, it is possible to define, in the discrimination data D, a condition that the frequencies f1 and f2 of the first and second signals S1 and S2 are higher than a prescribed frequency fb (the cycles T1 and T2 of the first and second signals S1 and S2 are both shorter than a prescribed cycle Tb). The prescribed frequency fb is a frequency higher than in a crossing event, and is a frequency that is considered to be a frequency observed during approach or recession. The prescribed cycle Tb is a cycle shorter than in a crossing event, and is a cycle that is considered to be a cycle observed during approach or recession.

Moreover, as shown in FIG. 12, as a condition for discriminating a human passing by in front of the multifunction product 100 (crossing the detection areas of the pyroelectric sensors), based on the above-mentioned characteristics of the relevant signals in a crossing event, it is possible to define, in the discrimination data D, a condition that the high-level periods of the first and second signals S1 and S2 both become first increasingly long and then increasingly short (the duty factors of the first and second signals S1 and S2 first increase and then decrease). For example, the main control section 5 checks whether or not the high-level periods of the first and second signals S1 and S2 both become longer several consecutive times and then become increasingly short.

Based on the discrimination data D described above, to recognize human movement direction, as shown in FIG. 6, the main control section 5 (the CPU 51 and the clock portion 54) measures the cycle T1 and the high-level period Th1 of the first signal S1. Based on the measured cycle T1, the main control section 5 can calculate the frequency f1 of the first signal S1. Moreover, by dividing the high-level period Th1 of the first signal S1 by its cycle T1, the main control section 5 can calculate the duty factor of the first signal S1.

Moreover, based on the discrimination data D described above, to recognize human movement direction, as shown in FIG. 6, the main control section 5 (the CPU 51 and the clock portion 54) measures the cycle T2 and the high-level period Th2 of the second signal S2. Based on the measured cycle T2, the main control section 5 can calculate the frequency f2 of the second signal S2. Moreover, by dividing the high-level period Th2 of the second signal S2 by its cycle T2, the main control section 5 can calculate the duty factor of the second signal S2.

Also in this embodiment. by using the cycle T1, the frequency f1, and the high-level period Th1 of the first signal S1, the cycle T2, the frequency f2, and the high-level period Th2 of the second signal S2, and the discrimination data D, the main control section 5 can recognize human movement direction. The cycle and the frequency are in an inversely proportional relationship, and therefore finding one allows the determination of the other.

As described above, in the third embodiment, the first detection portion 71, the first signal generation portion 81, the second detection portion 72, and the second signal generation portion 82 are so adjusted that the output waveforms of the first and second signals S1 and S2 are closer to each other. Moreover, in the discrimination data D, there are defined, as a condition for discriminating a human approaching or receding from the image forming apparatus (multifunction product 100), a condition that the frequencies f1 and f2 of the first and second signals S1 and S2 are higher than the prescribed frequency fb (that is, the cycles T1 and T2 of the first and second signals S1 and S2 are shorter than the prescribed cycle Tb); and as a condition for discriminating a human passing by, a condition that the duty factors of the first and second signals S1 and S2 both first increase and then decrease.

Furthermore, in this embodiment, the first and second detection portions 71 and 72 are so adjusted that the waveforms of the first and second signals S1 and S2 are closer together. Accordingly, as shown in FIG. 4, a synthesized signal generating portion 9 for synthesizing the first and second signals S1 and S2 together may be provided. FIG. 4 shows an example where, as the synthesized signal generating portion 9, an OR circuit is provided. Human movement direction (approaching, recessing, or crossing) may then be recognized/discriminated according to the so synthesized signal S3.

In FIG. 12, the timing chart shows the waveform of the synthesized signal S3 resulting from synthesis of the first and second signals S1 and S2 in each of approaching, receding, and crossing events. According to the direction of movement of a human with respect to the multifunction product 100, similar characteristics appear in the waveform of the synthesized signal S3 as well. Accordingly, also for the synthesized signal S3, conditions for determining whether a human is approaching, receding from, or passing by the multifunction product 100 may be included in the discrimination data D.

As shown in FIG. 12, as a condition for discriminating a human approaching or receding from the multifunction product 100, based on the above-mentioned characteristics of the synthesized signal S3 in an approaching event that reflect those of the first and second signals S1 and S2, it is possible to define, in the discrimination data D, a condition that the frequency f3 of the synthesized signal S3 is higher than the prescribed frequency fb (the cycle T3 of the synthesized signal S3 is shorter than the prescribed cycle Tb).

Moreover, as shown in FIG. 12, as a condition for discriminating a human passing by in front of the multifunction product 100, based on the above-mentioned characteristics of the synthesized signal S3 in an approaching event that reflect those of the first and second signals S1 and S2, it is possible to define, in the discrimination data D, a condition that the high-level period Th3 of the synthesized signal S3 becomes first increasingly long and then increasingly short (the duty factor of the synthesized signal S3 first increases and then decreases). The main control section 5 checks whether or not the high-level period Th3 of the synthesized signal S3 becomes longer several consecutive times and then becomes increasingly short.

Based on the discrimination data D for the synthesized signal S3, to enable recognition of human movement direction, the main control section 5 (the CPU 51 and the clock portion 54) can feed the synthesized signal S3 from the synthesized signal generating portion 9 to the main control section 5 (see FIG. 6). Based on the synthesized signal S3, the main control section 5 measures the cycle T3 and the high-level period Th3 of the synthesized signal S3. Based on the measured cycle T3, the main control section 5 can calculate the frequency f3 of the synthesized signal S3. Moreover, by dividing the high-level period Th3 of the synthesized signal S3 by its cycle T3, the main control section 5 can calculate the duty factor of the synthesized signal S3.

Thus, also by using the cycle T3, the frequency f3, and the high-level period Th3 of the synthesized signal S3 and the discrimination data D, the main control section 5 can recognize human movement direction. The main control section 5 can recognize human movement direction based on the first and second signals S1 and S2 and separately recognize human movement direction based on the synthesized signal S3 so as to conclude, when the two recognition results agree, that a human is moving closer, moving away, or passing by. Instead, the main control section 5 may recognize human movement direction based on the first and second signals S1 and S2 alone, or may recognize human movement direction based on the synthesized signal S3 alone.

In the waveform of the first and second signals S1 and S2 synthesized together (of the synthesized signal S3), there may appear characteristics in terms of frequency and cycle that allow discrimination of a human moving toward the image forming apparatus (multifunction product 100), or characteristics in terms of frequency and cycle that allow discrimination of a human moving away from the image forming apparatus, or characteristics in terms of frequency and cycle that allow discrimination of a human crossing the detection area. Accordingly, the image forming apparatuses (multifunction products 100) according to the second and third embodiments include, in addition to the configuration and benefits described previously in connection with the first embodiment, the synthesized signal generating portion 9 which synthesizes the first and second signals S1 and S2 to generate the synthesized signal S3; moreover, the storage portion 52 stores, as the discrimination data D, data defining variation patterns of the synthesized signal S3 so that the recognition portion (main control section 5) recognizes the variation pattern of the synthesized signal S3 and, according to whether or not it agrees with one defined in the discrimination data D, recognizes human movement direction. It is thus possible to accurately recognize the direction of movement of a human with respect to the image forming apparatus (multifunction product 100).

Moreover, in the image forming apparatuses (multifunction products 100) according to the second and third embodiments, the pyroelectric sensor of the first detection portion 71 is provided with the first lens 71L, the pyroelectric sensor of the second detection portion 72 is provided with the second lens 72L, and the first and second lenses 71L and 72L are given different focal points. This makes it possible to intentionally give the first and second signals S1 and S2 such waveforms in which so notable characteristics appear as to allow discrimination of whether a human is moving toward the image forming apparatus (multifunction product 100), moving away from it, or crossing the detection area.

The present disclosure is to be understood to disclose corresponding methods as well.

While the present disclosure has proceeded by way of embodiments, they are in no way meant to limit the scope of the disclosure; what is disclosed herein may be implemented with any modifications or variations made without departing from the spirit of the present disclosure.

What is claimed is:

1. An image forming apparatus, comprising:
   a first detection portion including a pyroelectric sensor and adapted to detect an upper half of a human body;
   a first signal generation portion adapted to receive an output of the pyroelectric sensor of the first detection portion to generate a first signal whose level varies according to whether or not an output value of the pyroelectric sensor of the first detection portion is greater than a prescribed threshold value;
   a second detection portion including a pyroelectric sensor and adapted to detect a lower area than the first detection portion to detect a lower half of the human body;
   a second signal generation portion adapted to receive an output of the pyroelectric sensor of the second detection portion to generate a second signal whose level varies according to whether or not an output value of the pyroelectric sensor of the second detection portion is greater than a prescribed threshold value;
   a storage portion for storing discrimination data defining, with respect to waveforms of the first and second signals, a relationship between the first and second signals in terms of frequency or cycle and a variation pattern of duty factors of the first and second signals, the discrimination data including data defining a condition for recognizing a human moving toward the image forming apparatus, a condition for recognizing a human moving away from the image forming apparatus, and a condition for recognizing a human crossing a detection area of the pyroelectric sensors; and a recognition portion adapted to calculate a frequency or cycle of the first and second signals and recognize, based on the relationship between the first and second signals in terms of frequency or cycle, the variation pattern of the duty factors of the first and second signals, and the discrimination data, whether a human is moving toward the image forming apparatus, whether a human is moving away from the image forming apparatus, and whether a human is crossing the detection area of the pyroelectric sensors.

2. The apparatus according to claim 1, further comprising a power supply portion adapted to shift the image forming apparatus into power saving mode by supplying electric power to only a portion of the image forming apparatus when the recognition portion recognizes a human moving away from the image forming apparatus while a power saving mode is not in effect, to cancel power saving mode by restarting supply of electric power to all or part of the portion to which the supply of electric power has been stopped in power saving mode when the recognition portion recognizes a human moving toward the image forming apparatus while power saving mode is in effect, and not to change an electric power supply mode when the recognition portion recognizes a human crossing.

3. The apparatus according to claim 1, further comprising a synthesized signal generation portion adapted to generate a synthesized signal by synthesizing the first and second signals together, wherein the storage portion stores, in the discrimination data, data defining a variation pattern of the synthesized signal, and the recognition portion is adapted to recognize a variation pattern of the synthesized signal to recognize the direction of the movement of the human based on whether or not the recognized pattern agrees with the pattern defined in the discrimination data.

4. The apparatus according to claim 3, wherein the pyroelectric sensor of the first detection portion is provided with a first lens, the pyroelectric sensor of the second detection portion is provided with a second lens, and the first and second lenses have different focal points.

5. The apparatus according to claim 1, wherein the pyroelectric sensor of the first detection portion is provided with a first lens, the pyroelectric sensor of the second detection portion is provided with a second lens, the first and second lenses have equivalent characteristics, and the storage portion stores, in the discrimination data, as the condition for recognizing a human approaching the image forming apparatus, conditions that a frequency of the first signal is lower than a frequency of the second signal and that a duty factor of the first signal is increasing, as the condition for recognizing a human receding from the image forming apparatus, conditions that the frequency of the first signal is lower than the frequency of the second signal and that the duty factor of the first signal is decreasing, and as the condition for recognizing a human crossing, conditions that the frequency of the first signal is higher than the frequency of the second signal and that a duty factor of the second signal first increases and then decreases.

6. The apparatus according to claim 1, wherein the first detection portion, the first signal generation portion, the second detection portion, and the second signal generation portion are adjusted such that output waveforms of the first and second signals are closer to each other, and the storage portion stores, in the discrimination data, as the condition for recognizing a human approaching the image forming apparatus, a condition that duty factors of the first and second signals are increasing, as the condition for recognizing a human receding from the image forming apparatus, a condition that the duty factors of the first and second signals are decreasing, and as the condition for recognizing a human crossing, a condition that frequencies of the first and second signals are higher than a prescribed frequency.

7. The apparatus according to claim 1, wherein the first detection portion, the first signal generation portion, the second detection portion, and the second signal generation portion are adjusted such that output waveforms of the first and second signals are closer to each other, and the storage portion stores, in the discrimination data, as the condition for recognizing a human approaching or receding from the image forming apparatus, a condition that frequencies of the first and second signals are higher than a prescribed frequency, and as the condition for recognizing a human crossing, a condition that duty factors of the first and second signals both first increase and then decrease.

8. A method of controlling an image forming apparatus, comprising:

detecting an upper half of a human body using a first detection portion including a pyroelectric sensor;

receiving an output of the pyroelectric sensor of the first detection portion to make a first signal generation portion generate a first signal whose level varies according to whether or not an output value of the pyroelectric sensor of the first detection portion is greater than a prescribed threshold value;

detecting a lower half of the human body using a second detection portion including a pyroelectric sensor and detecting a lower area than the first detection portion;

receiving an output of the pyroelectric sensor of the second detection portion to make a second signal generation portion generate a second signal whose level varies according to whether or not an output value of the pyroelectric sensor of the second detection portion is greater than a prescribed threshold value;

storing, as discrimination data, data defining, with respect to waveforms of the first and second signals, a relationship between the first and second signals in terms of frequency or cycle and a variation pattern of duty factors of the first and second signals, the discrimination data including data defining a condition for recognizing a human moving toward the image forming apparatus, a condition for recognizing a human moving away from the image forming apparatus, and a condition for recognizing a human crossing a detection area of the pyroelectric sensors; and calculating a frequency or cycle of the first and second signals and recognizing, based on the relationship between the first and second signals in terms of frequency or cycle, the variation pattern of the duty factors of the first and second signals, and the discrimination data, whether a human is moving toward the image forming apparatus, whether a human is moving away from the image forming apparatus, and whether a human is crossing the detection area of the pyroelectric sensors.

9. The method according to claim 8, comprising:

shifting the image forming apparatus into a power saving mode by supplying electric power to only a portion of the image forming apparatus when the recognition portion recognizes a human moving away from the image forming apparatus while a power saving mode is not in effect;

canceling power saving mode by restarting supply of electric power to all or part of the portion to which the supply of electric power has been stopped in power saving mode when the recognition portion recognizes a human moving toward the image forming apparatus while power saving mode is in effect; and not changing an electric power supply mode when the recognition portion recognizes a human crossing.

10. The method according to claim 8, comprising:

generating a synthesized signal by synthesizing the first and second signals together;

storing, in the discrimination data, data defining a variation pattern of the synthesized signal;

recognizing a variation pattern of the synthesized signal; and recognizing the direction of the movement of the human based on whether or not the recognized pattern agrees with the pattern defined in the discrimination data.

11. The method according to claim 10, wherein a first lens for the pyroelectric sensor of the first detection portion and a second lens for the pyroelectric sensor of the second detection portion have different focal points.

12. The method according to claim 8, wherein the first and second lenses have equivalent characteristics, and in the discrimination data, there are defined, as the condition for recognizing a human approaching the image forming apparatus, conditions that a frequency of the first signal is lower than a frequency of the second signal and that a duty factor of the first signal is increasing, as the condition for recognizing a human receding from the image forming apparatus, conditions that the frequency of the first signal is lower than the frequency of the second signal and that the duty factor of the first signal is decreasing, and as the condition for recognizing a human crossing, conditions that the frequency of the first signal is higher than the frequency of the second signal and that a duty factor of the second signal first increases and then decreases.

13. The method according to claim 8, wherein the first detection portion, the first signal generation portion, the second detection portion, and the second signal generation portion are adjusted such that output waveforms of the first and second signals are closer to each other, and in the discrimination data, there are defined, as the condition for recognizing a human approaching the image forming apparatus, a condition that duty factors of the first and second signals are increasing, as the condition for recognizing a human receding from the image forming apparatus, a condition that the duty factors of the first and second signals are decreasing, and as the condition for recognizing a human crossing, a condition that frequencies of the first and second signals are higher than a prescribed frequency.

14. The method according to claim 8, wherein the first detection portion, the first signal generation portion, the second detection portion, and the second signal generation portion are adjusted such that output waveforms of the first and second signals are closer to each other, and in the discrimination data, there are defined, as the condition for recognizing a human approaching or receding from the image forming apparatus, a condition that frequencies of the first and second signals are higher than a prescribed frequency, and as the condition for recognizing a human crossing, a condition that duty factors of the first and second signals both first increase and then decrease.

* * * * *